(12) United States Patent
Fortin et al.

(10) Patent No.: US 9,246,626 B2
(45) Date of Patent: Jan. 26, 2016

(54) NETWORK OPERATING SYSTEM WITH DISTRIBUTED DATA ARCHITECTURE

(75) Inventors: Guy Claude Fortin, Ottawa (CA); Markus Messenschmidt, Ottawa (CA); Jeffrey Kenneth Emery, Ottawa (CA); Hock Gin Lim, Green Brook, NJ (US); Ralph Stemmer, Whitehouse Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1195 days.

(21) Appl. No.: 11/826,672

(22) Filed: Jul. 17, 2007

(65) Prior Publication Data

US 2008/0212963 A1  Sep. 4, 2008

Related U.S. Application Data

(60) Division of application No. 10/244,913, filed on Sep. 16, 2002, now Pat. No. 7,263,290, and a continuation-in-part of application No. 10/163,939, filed on Jun. 6, 2002, now Pat. No. 7,747,165.

(51) Int. Cl.
 *H04B 10/00* (2013.01)
 *H04J 14/02* (2006.01)
 (Continued)

(52) U.S. Cl.
 CPC ......... *H04J 14/0278* (2013.01); *H04J 14/0228* (2013.01); *H04J 14/0241* (2013.01);
 (Continued)

(58) Field of Classification Search
 USPC .................................................. 398/43–103
 See application file for complete search history.

(56) References Cited

U.S. PATENT DOCUMENTS 6,259,679 B1 * 7/2001 Henderson et al. ........... 370/254
6,621,621 B1 * 9/2003 Jones et al. ............... 359/337.11
(Continued)

FOREIGN PATENT DOCUMENTS

WO  00/76105  12/2000

OTHER PUBLICATIONS

G. Lehr et al., "Management of all-optical WDM networks: First results of European research project Moon", Network Operations and Management Symposium, NOMS 98, IEEE New Orleans, LA, USA, pp. 870-879 Feb. 15, 1998, XP010267453.
(Continued)

*Primary Examiner* — Agustin Bello
(74) *Attorney, Agent, or Firm* — Capitol Patent & Trademark Law Firm, PLLC

(57) ABSTRACT

A network operating system NOS for an agile optical network with a plurality of mesh interconnected switching nodes, manages the network using an object-oriented network information model. The model is common to all applications requiring the data stored in the network managed information base. The core model can be expanded for serving specific application areas. The NOS is organized in layers, at the optical module level, connection level and network level. A distributed topology server DTS organizes the physical, logical and topological data defining all network entities as managed objects MO and topology objects TO for constructing a complete network view. The network information model associates a network element NE information model, specified by managed objects MO and a topological information model, specified by topology objects TO. The MOs are abstract specific NE data that define network implementation details and do not include any topological data, while the TOs abstract specific topological data for defining a trail established within the network, and do not include any NE data. The models are associated in a minimal number of points to construct the model of a trial in response to a connection request.

16 Claims, 24 Drawing Sheets

(51) Int. Cl.
*H04L 29/12* (2006.01)
*H04L 12/24* (2006.01)
*H04Q 11/00* (2006.01)

(52) U.S. Cl.
CPC .... *H04L29/12009* (2013.01); *H04L 29/12207* (2013.01); *H04L 41/12* (2013.01); *H04L 61/20* (2013.01); *H04Q 11/0062* (2013.01); *H04J 14/0227* (2013.01); *H04Q 2011/0069* (2013.01); *H04Q 2011/0079* (2013.01); *H04Q 2011/0088* (2013.01)

(56) References Cited

U.S. PATENT DOCUMENTS

| | | | |
|---|---|---|---|
| 6,647,428 B1 | 11/2003 | Bannai et al. | |
| 6,728,486 B1 | 4/2004 | Hutchison et al. | |
| 7,046,665 B1 * | 5/2006 | Walrand et al. | 370/392 |
| 7,088,920 B2 * | 8/2006 | Krishnaswamy et al. | 398/58 |
| 7,171,124 B2 * | 1/2007 | Smith et al. | 398/97 |
| 7,599,620 B2 * | 10/2009 | Graves et al. | 398/51 |
| 7,734,172 B2 * | 6/2010 | Tse-Au | 398/9 |
| 7,787,769 B1 * | 8/2010 | Slezak et al. | 398/57 |
| 7,970,282 B2 | 6/2011 | Nagatomo et al. | 398/126 |
| 2002/0186434 A1 * | 12/2002 | Roorda et al. | 359/128 |
| 2003/0016410 A1 * | 1/2003 | Zhou et al. | 359/110 |
| 2003/0016411 A1 * | 1/2003 | Zhou et al. | 359/110 |
| 2003/0020977 A1 * | 1/2003 | Smith et al. | 359/110 |

OTHER PUBLICATIONS

Slobodanka Tomic, "Management Information Model for Optical WDM Networks", Interoperable Communications Network, Baltzer Science Publishers, vol. 2, No. 1, pp. 147-160, Jan. 1, 1999, XP001011288.

Search Report dated Mar. 4, 2009, issued in European Patent Application No. 02012451.7.

* cited by examiner

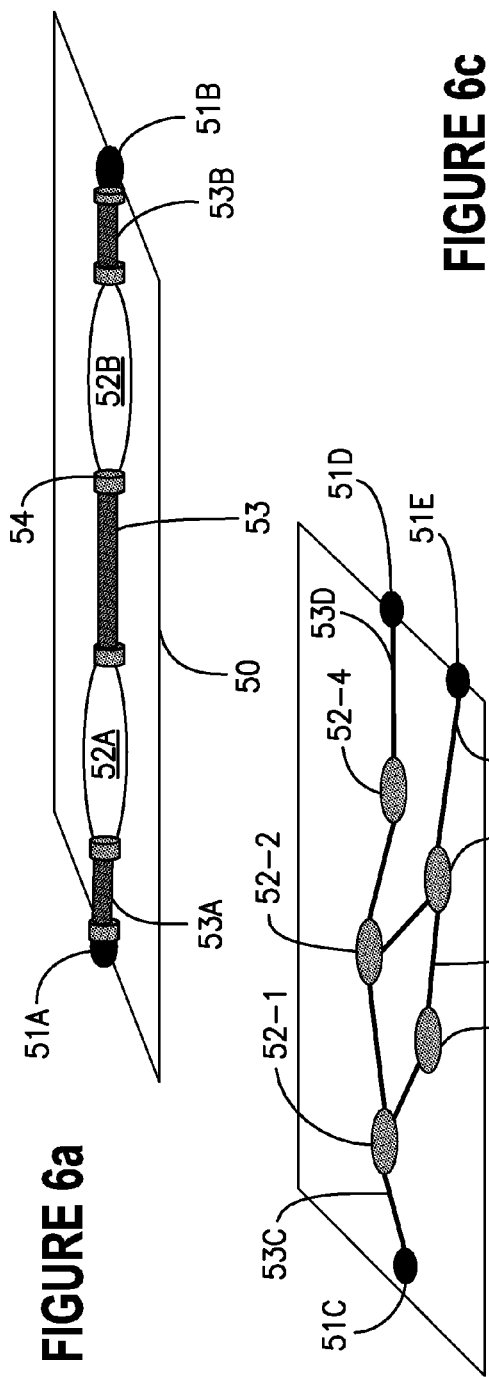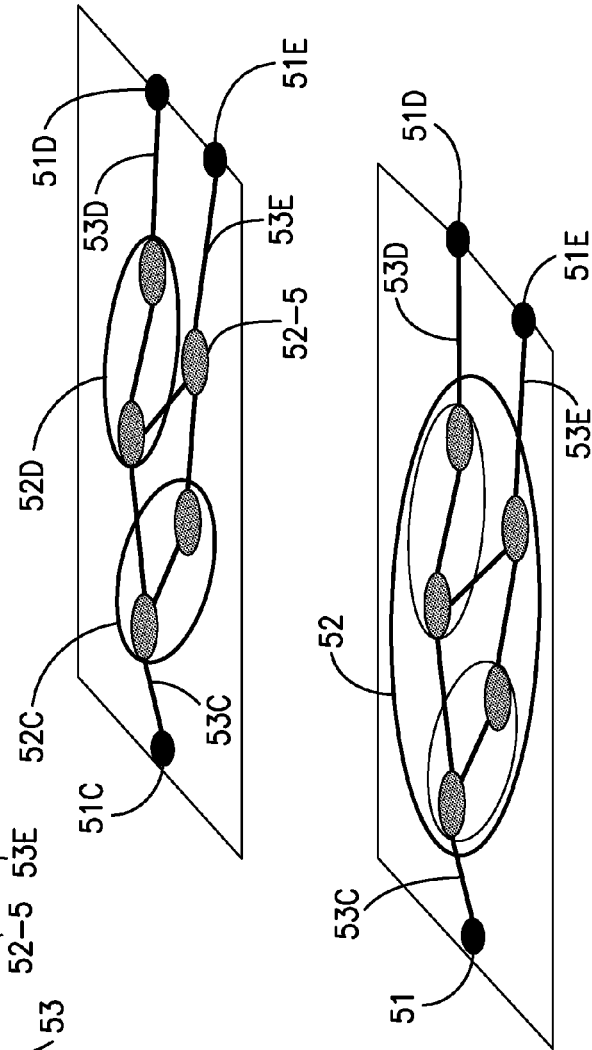

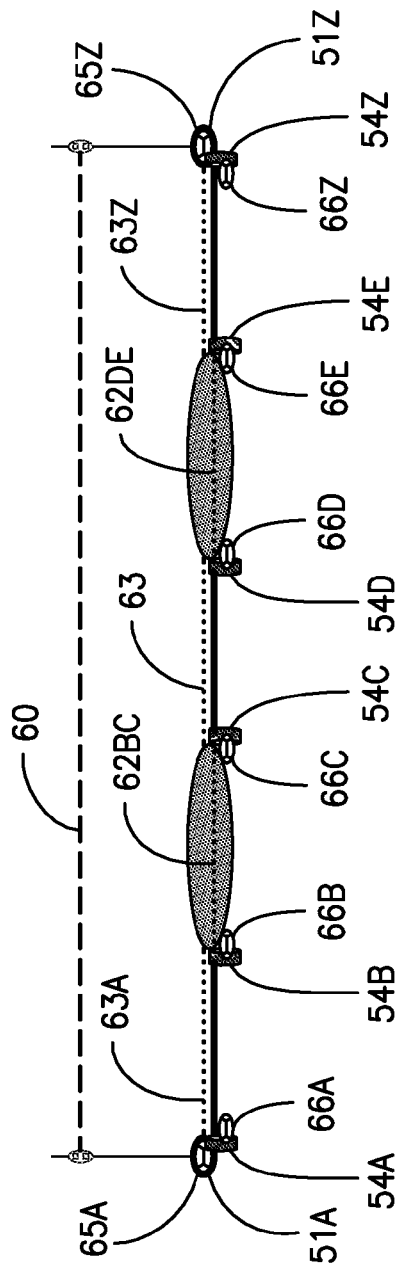
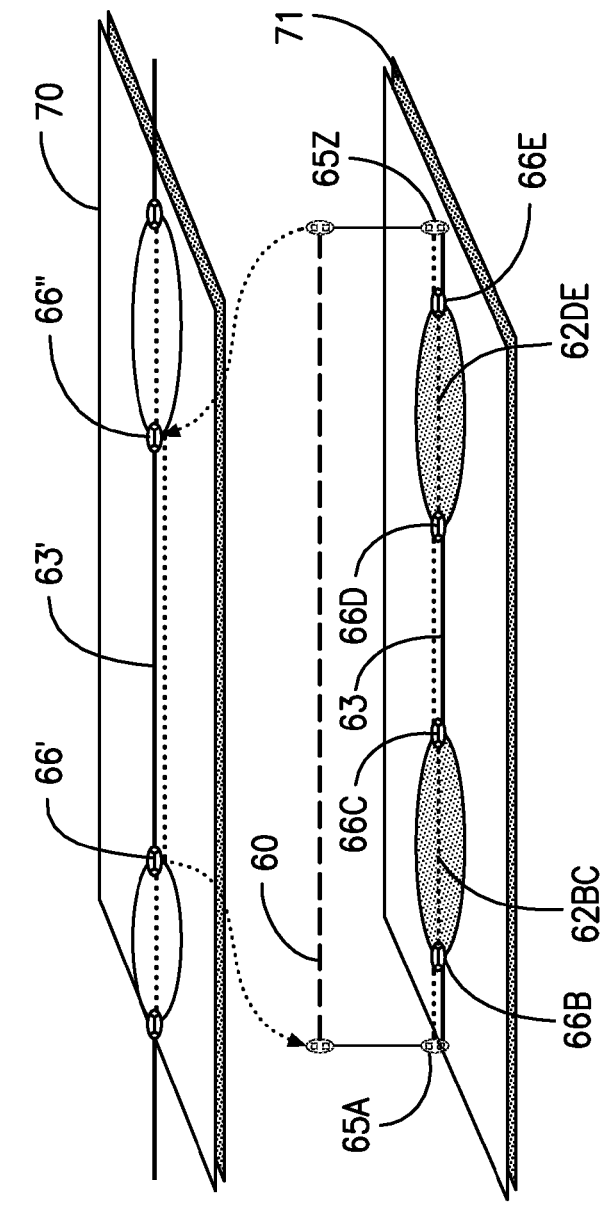
FIGURE 6e
FIGURE 6f

NETWORK OPERATING SYSTEM WITH DISTRIBUTED DATA ARCHITECTURE

PRIORITY PATENT APPLICATION

This application is a divisional of U.S. patent application Ser. No. 10/244,913 filed Sep. 16, 2002, now U.S. Pat. No. 7,263,290, which is a continuation-in-part of U.S. patent application Ser. No. 10/163,939 filed Jun. 6, 2002, now U.S. Pat. No. 7,747,165, which claims priority from U.S. Provisional Application Ser. No. 60/298,008 filed Jun. 13, 2001.

RELATED PATENT APPLICATIONS

U.S. patent application Ser. No. 09/876,391, "Architecture For a Photonic Transport Network", filed Jun. 7, 2001.

US Patent Application "Method for Engineering Connections in a Dynamically Reconfigurable Photonic Switched Network" Ser. No. 10/159,676 filed May 31, 2002, now U.S. Pat. No. 7,941,047.

U.S. patent application Ser. No. 09/909,265, "Wavelength Routing and Switching Mechanism for a Photonic Transport Network" filed Jul. 19, 2001, now U.S. Pat. No. 7,171,124.

These patent applications are incorporated herein by reference.

FIELD OF THE INVENTION

The invention resides in the field of optical communication networks, and is directed in particular to a network operating system with distributed data architecture.

BACKGROUND OF THE INVENTION

Due to increased competition and eroding revenue margins, service providers are demanding better yields from their network infrastructure. Thus, bandwidth-on-demand for event driven traffic, or creation of bandwidth brokering services are just a few of the new optical layer services that can be created. Attributes such as protection level, latency, priority, transparency, and diversity may also be used to define optical services. These need to be either general characteristics of the network or specific characteristics of a connection. As such, class of service (CoS) considerations need to be taken into account both when planning a network, when routing an individual connection, and when collecting the revenue.

These demands have exposed a number of weaknesses with respect to the current optical networks and their mode of operation.

Traditional WDM (wavelength division multiplexed) network has a point-to-point configuration, with electrical cross-connects (EXC) provided at all switching nodes. This network architecture allows fairly limited optical layer service offerings and is also very difficult to scale. Thus, a point-to-point architecture does not have the ability to turn up/down bandwidth rapidly, or/and to provide bandwidth optimized for the data layer needs, even if the equipment for the new service is in place.

As a result, there is a trend to transit from the point-to-point configurations to a new architecture, where the connections are routed, switched and monitored independently. To enable automatic or 'point-and-click', dynamic connection set-up and removal, the network management must avail itself with a very accurate inventory of all current network resources at a finer granularity (i.e. at the optical module level) than in current networks. This information must also include the real-time allocation of the network resources to the currently active connections. Furthermore, in this type of network, the traditional manual span-by-span engineering cannot be performed as the channels sharing the same fiber do not have the same origin, destination and network traversing history. Rather, the network management must be provided with automatic end-to-end optical path engineering, which requires availability of large amount of performance and topology data. Thus, the network management must keep an updated view of the actual and estimated optical performance for all optical spans, links, paths in the context of connections being set-up and torn down arbitrarily.

In short, the network management of an agile optical network needs to be provided with a means to collect, update, and maintain topology and performance information and with the ability to fast retrieve it when needed. This in turn implies changes in the type and granularity of the network data that is kept, and also in the way this data is organized.

SUMMARY OF THE INVENTION

It is an object of the invention to provide an optical network with a distributed data architectures that enables dynamic reconfiguration of network connectivity, flexibility and scalability.

Accordingly, the invention provides an object-oriented network information mode for an agile optical network having a plurality of interconnected switching nodes, comprising: a core network information model that is common to all applications requiring the information provided by the model; and an extension to the core network information model for serving specific application areas.

In accordance with another aspect of the invention, a network operating system NOS for an agile optical network having a plurality of interconnected switching nodes comprises: at an embedded layer organized in embedded domains under control of a shelf processor SP, a SP for controlling operation of all optical modules in the embedded domain based on physical, logical and topological data reported by the optical modules; at a network services control NSC layer organized in spans of control SOC under control of a respective NSC, a NSC for controlling operation all network elements NE in the SOC based on physical, logical and topological data reported by the NEs; and a distributed topology server DTS for organizing the data as managed objects MO and topological objects TO based on the physical, logical and topological data for constructing a complete network view.

Still further, the invention is directed to a network element NE information model defined by a plurality of managed elements MO, where each MO comprises specific data describing a respective network entity, and a list with the classes of all MOs it contains, affects, supports and inherits from, for modeling the NEs that implement the network and specifically not to model connections across the network in which the NE participates, the NE information model comprising: an equipment holder class, containing k equipment holder MOs; an equipment class containing l equipment MOs, each containing m software objects, and inheriting from one of an equipment holder object and a circuit pack object; and a termination point class, containing n termination point objects, each inheriting from one of a trail termination point TTP object that specifies a potential termination of an optical path and a connection termination point CTP object that specifies a potential termination of a connection.

According to a further aspect of the invention, an MIB of an agile optical network, provides a layered topology information model for modeling potential connections over the network and specifically not to model the network elements that implement the network, the topology information model comprising: a topological components class including layer network objects, access group objects, subnetwork objects, link objects and link end objects; a transport entities class including trail objects, subnetwork connection objects, and link connection objects; and a termination point class including trail termination point TTP objects, a TTP object for specifying the ends of a trail object and connection termination point CTP objects, a CTP object for specifying the ends of a link connection object.

In another aspect, the invention is concerned with a high level signaling architecture for establishing communication between an internal network domain encompassing an agile optical network and a client domain, comprising: an internal signaling network, operating over a UNI-N interface for supporting all management and control operations that enable automatic set-up and removal of end-end trails within the agile optical network; a NMS-UNI interface for enabling network-level applications including performance, fault, configuration, security management and common applications, as well as distribution of addresses to all network entities on the internal signaling network; and a UNI signaling interface between the internal signaling network and a user terminal in the client domain for transmitting a connection request and specifying a class of service for the request.

In order to model a call in an agile optical network mesh interconnecting a plurality of switching nodes, the network having a R&S control for calculating end-to-end trails and a MIB holding a network information model, the method according to the invention comprises the steps of: (a) receiving a connection request specifying a source node, a destination node, and a class of service CoS; (b) creating a call ID for identifying the call, and a trail ID for identifying a trail between the source and destination node, and requesting the R&S control to provide explicit trail data including the nodes along the trail; (c) reserving the trail; and (d) activating the trail for establishing the call over the trail.

The distributed data architecture according to the invention allows maintaining and organizing a large amount of performance and topology information at the optical module granularity, for enabling dynamic reconfiguration of network connections.

BRIEF DESCRIPTION OF THE DRAWINGS

The foregoing and other objects, features and advantages of the invention will be apparent from the following more particular description of the preferred embodiments, as illustrated in the appended drawings, where:

FIGS. 6a-6f provide the definition of the terms used for the network topology model according to the invention. FIG. 6a shows the topology components, FIGS. 6b-6c show how a detailed network (FIG. 6b) can be abstracted recursively within more abstract partitioned subnetworks (FIG. 6c) and then a single subnetwork (FIG. 6d). FIG. 6e illustrates the transport entities that model the carrying of traffic on the network and FIG. 6f shows the concept of network layering as used by the topology model;

FIG. 7A is the topology model at the optical path level, FIG. 7B shows the topology model at the optical multiplex section level, and FIG. 7C shows the layered model for the same network;

FIG. 8A is an example of a network represented by the topology components, and FIG. 8B shows the topology model objects for the example of FIG. 8A FIGS. 9A and 9B show the associations between the NE information model and topology information model for providing the system management information model.

FIG. 11A shows a four node physical network, FIGS. 11B and 11C illustrate the topology and NE information models respectively for the network of FIG. 11A, and FIG. 11D shows the association between the topology and NE information models;

FIG. 12A shows the reserved 0:2 call, FIG. 12B shows the activated 0:2 cal and FIG. 12C illustrates the SNC and cross-connections for the 0:2 call; FIG. 13A shows the model for the protection trail, and FIG. 13B shows the model for the reverted 0:2 call.

DETAILED DESCRIPTION OF THE PREFERRED EMBODIMENTS

Figure 1:
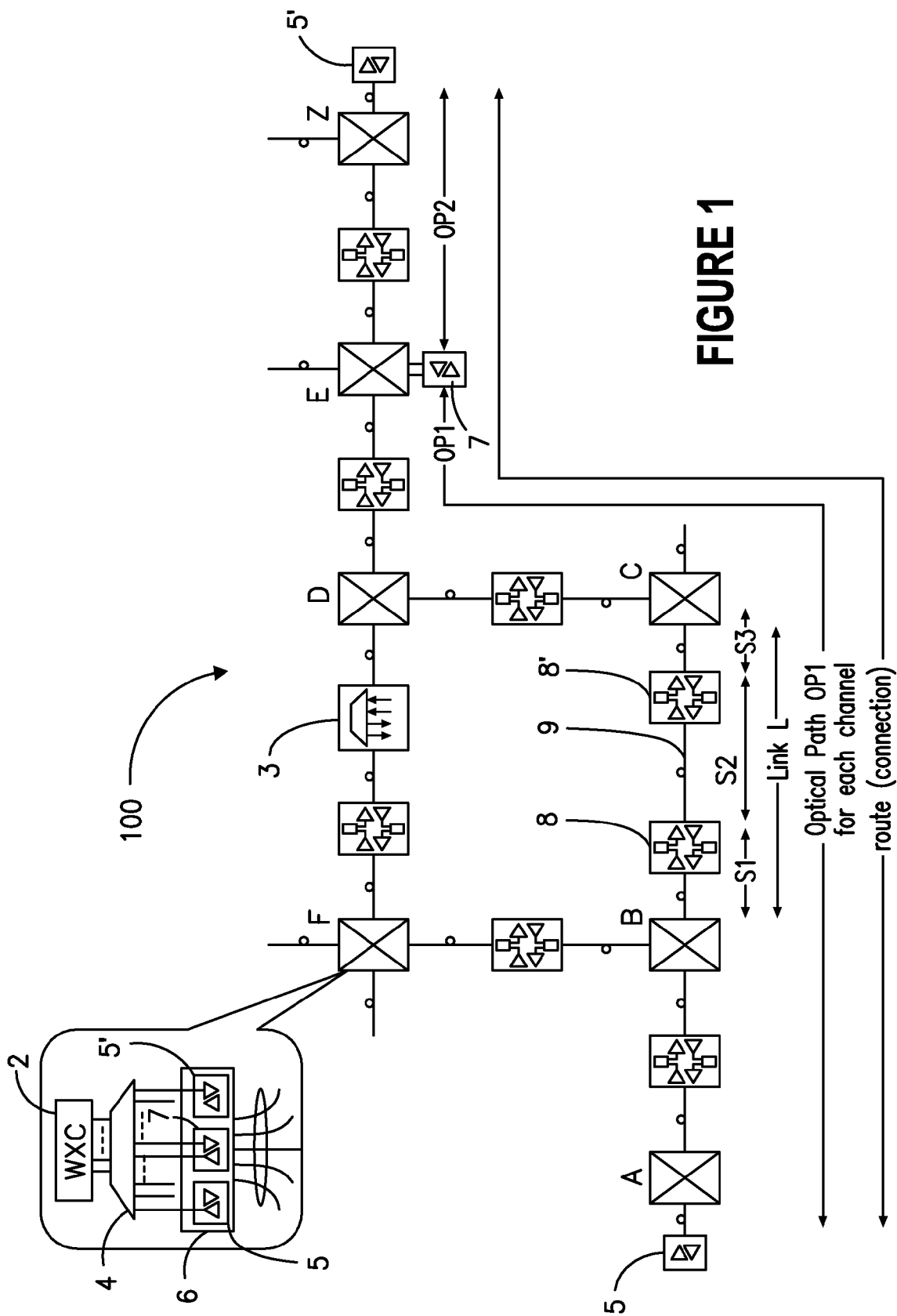
FIG. 1 is an example of a fragment of an agile optical network where the present invention may be used.

FIG. 1 illustrates a fragment of an agile optical network 100 for defining some terms used in this specification.

"Agile optical network" (also referred to as "photonic network", "all optical network", "automatically switched optical network ASON", or "wavelength switched network") refers to a WDM network, which allows to transparently convey user traffic of various formats on end-to-end (rather than point-to-point) connections. The term 'connection' refers here to an end-to-end logical route, which can be set-up along a plurality of physical trails (routes, paths). For example, an A-Z connection transporting traffic between node A and node Z, can be established along an end-to-end trail A-B-C-D-E-Z, or along an alternative end-to-end trail A-B-F-D-E-Z.

Connection are established in real-time (rather than being pre-provisioned) in agile network 100, the user traffic being automatically switched at all or some intermediate nodes in optical format.

The term "wavelength switching node WXC", or "flexibility point" or "switching node" refers to a node A, B, C, D, E, F or Z of network 100, which is equipped with a switch 2 for switching the traffic from an input fiber to an output fiber, and where traffic may also be added or dropped.

The nodes of network 100 are connected over a line system, which includes the fiber 9 and the optical amplifiers 8, 8' that condition the WDM traffic for long and ultra long haul transmission.

FIG. 1 also shows an OADM node 3. Such a node enables add, drop and optical passthrough. The difference from a switching node is that the OADM does not switch traffic from a line to another; it is connected over a single line.

A block diagram for a node that enables add, drop or add/drop (i.e. OADM nodes 3 and some switching nodes 2) is shown in the insert for node F. An electro-optics system 6 performs on/off ramp of client signals onto/from the optical network and interfaces with the network over an access multiplexing and switching systems 4. Electro-optics system 6 includes transponders 5 (a long reach LR Tx-Rx pair and a short reach SR Tx-Rx pair), which are the interface between the network and the user's equipment. Regenerators 7 (a LR Tx-Rx pair) are also part of the electro-optics system 6; they provide OEO-based wavelength regeneration and conversion in the network core. In network 100, regenerators 7 are provided only at switching nodes 2 and OADM nodes 3. They are switched in a route only when necessary for signal conditioning (at OADM and WXC nodes) and/or for wavelength conversion (at WXC nodes).

Access multiplexing/demultiplexing system 4 provides distribution of individual wavelengths from the line 9 to the optical receivers and provides aggregation of individual wavelengths from the optical transmitters onto the line system.

The term 'optical path' refers to the portion of a connection between a transmitter and the next receiver; the user traffic is carried along the optical path on an optical channel automatically allocated to the optical path. The term 'channel' is used to define a carrier signal of a certain wavelength modulated with an information signal.

An end-to-end trail assigned to a connection may have one or more successive 'optical paths', using regenerators at the ends of the optical paths for wavelength conversion or signal conditioning as/if needed. In the example of FIG. 1, the end-to-end trail A-B-C-D-E-Z has two successive optical paths. A first path OP1 originates at node A, where the transmitter of transponder 5 modulates the user traffic over a certain channel of wavelength $\lambda i$. The path OP1 passes through node B and C in optical format and ends at node D, where the receiver of regenerator 7 recovers the user traffic carried by $\lambda i$. A second optical path OP2 connects nodes D and Z, using another channel of a wavelength $\lambda j$, or reusing $\lambda i$. Regenerator 7 is used at node D for conditioning the user traffic, or for changing the carrier wavelength.

The term 'section' or 'span' refers to the portion of the network 100 between two optical amplifier huts. For example, span S2 includes the fiber 9 between the output of amplifier 8 and input of amplifier 8' and the equipment making-up the optical amplifier 8'. Link L has three spans, denoted with S1, S2 and S3. The term 'link' is used for the portion of the network between two successive flexibility sites, such as link L shown between nodes B and C. This term should not be confused with the link object used in the network model.

Network Management

Figure 2:
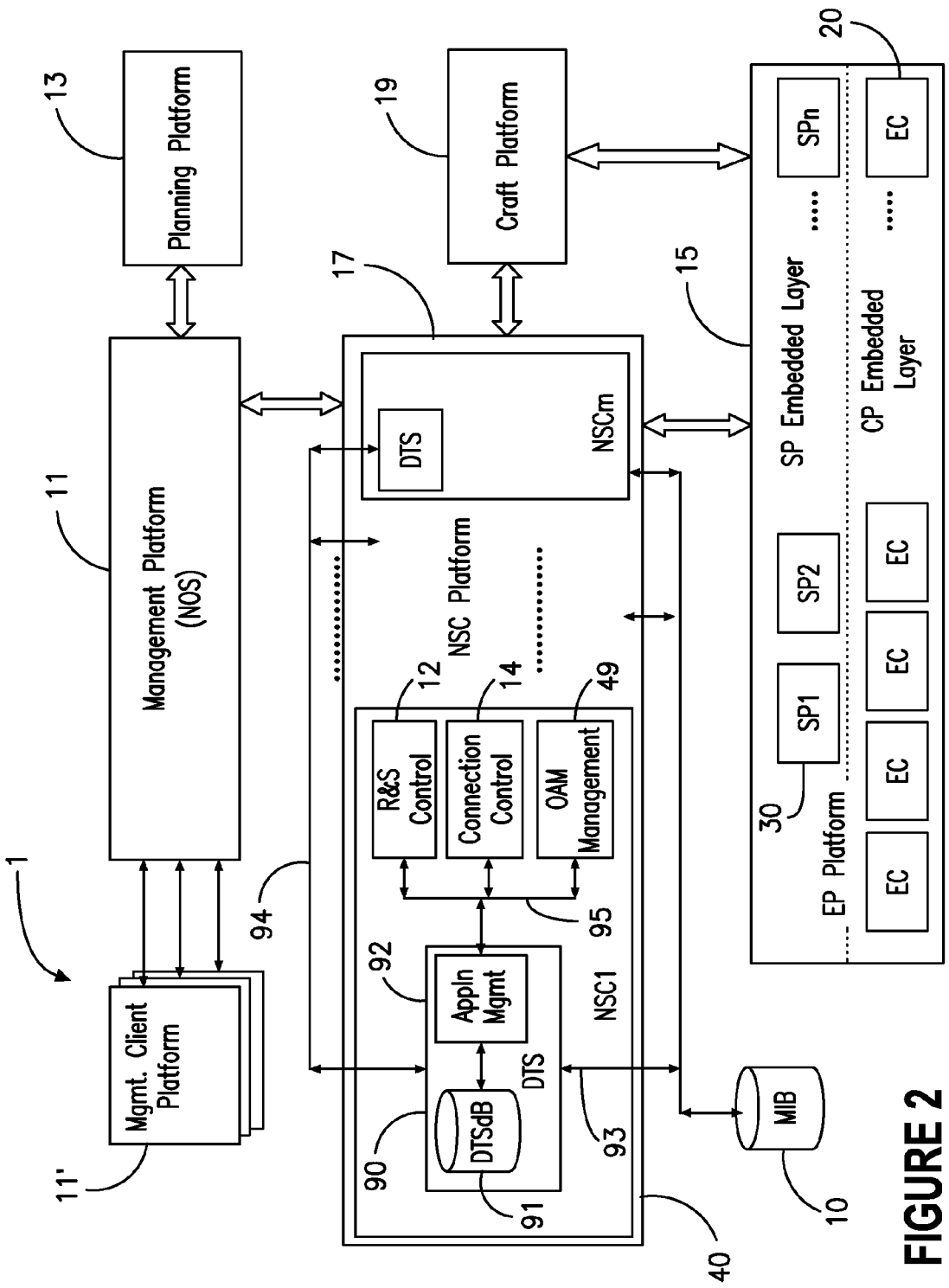
FIG. 2 shows the computing platforms of the network operating system of the agile optical network of FIG. 1.

Network 100 is managed by an intelligent network operating system NOS 1, shown in FIG. 2. NOS 1 allows, among other functions, end-to-end connection provisioning without manual intervention, selective regeneration for the passthrough channels in need of conditioning, full transmitter wavelength agility and assignment, photonic layer UNI (user network interface). It also allows fault monitoring, photonic layer network management, and contributes to automated commissioning, integrated planning and engineering applications.

The NOS 1 of photonic network 100 maintains a real-time view of the network resources, their actual and estimated performance and their connectivity. The NOS represents this information using a distributed object-oriented approach. This is enabled mainly by:

1. Provision of an additional processing platform at the physical layer and the associated signaling and control, to allow monitoring and control at optical modules level, shelf level and NE level. This approach broadens the definition of the managed objects to include the managed objects of the embedded platform layer (card-packs and shelves).

2. Provision of an optical topology channel between all modules of network 100 and extension of data communication and signaling at the embedded platform layer. This enables a hierarchical, down-up reporting of network configuration.

3. Provision of monitoring points throughout the network for collecting real-time optical layer performance data. This data is used in optical control loops, which set and maintain the parameters of the optical devices within the operational ranges. In this way, the network is unconditionally stable in the presence of channel add, channel remove and other churn.

4. Provision of a signaling and control network 55 (see FIG. 10). This internal network supports the management and control functions by enabling communication of control and monitoring data between all interested entities in the network.

These enablers are described in the above-identified co-pending patent applications Ser. No. 09/876,391 and Ser. No. 10/159,676.

The management and control functions of the NOS 1 have a layered architecture that build on a modular hardware structure; the distributed data architecture also follows-up this hierarchical arrangement.

The computing platforms include an embedded processing platform EP 15 which operates at the module and shelf layer, a network services control platform 17, which operates at the link and connection layer, and a network management platform NMP 11, which operates at the network layer.

Provision of the embedded layer 15 enables extending the intelligence into the physical layer of network 100, to allow new network functionality such as scalability and automatic routing and switching.

The embedded processing platform 15 has two distinct sub-layers of processing, namely a circuit-pack (CP) embedded layer and a shelf embedded layer. More precisely, most card packs use a standard card equipped with an embedded controller 20 and optical connectors to receive the specific optical modules that provide the respective functionality. The shelf embedded platform includes the shelf processors 30 provided on all the shelves that make-up optical network 100. All shelves of network 100 use a standard backplane and are equipped with a standard shelf processor SP card and a plurality of specific card-packs to provide the respective shelf functionality.

A SP 30 manages and controls the ECs in the respective embedded domain (a shelf of equipment) over a shelf network, and provides an interface with the NSC platform 17. Each shelf processor SP 30 distributes addresses to the optical modules in the domain under its control, and collects topology and performance data based on these addresses and adjacency information. As the card-packs may be inserted in any card slot of a shelf, each SP 30 determines if the card-packs in the respective embedded domain form a legal entity based on templates, and alarms illegal configurations.

The NSC platform 17 comprises a network services controller (NSC) 40 for each switching node, such as nodes A, C, Z in FIG. 1, to provide network 100 with control, signaling and routing capabilities.

A NSC 40 manages and controls the shelf units in a negotiated span of control (SOC). The signaling and control network allow communication between the NSC and the managed objects in its SOC. A NSC 40 is responsible with distributing addresses to all managed elements in the SOC, determines if the shelf units form a legal entity and alarms illegal configurations.

The primary functions of the NSC are routing and switching control shown at 12, connection control shown at 14 and OAM management shown at 49. The R&S control 12 is equipped with a routing and switching mechanism, which finds the best trail for a connection according to various classes of service. Details on operation of R&S module are provided in the above identified co-pending U.S. patent application Ser. No. 09/909,265 filed Jul. 19, 2001, now U.S. Pat. No. 7,171,124.

Performance of each connection is also monitored and controlled from NSC platform, as shown by the network connection controller block 14. NCC 14 uses measured data collected in various points of the network, and network-wide performance targets to maintain the performance of a connection at a desired level. Details on operation of this control are provided in the above-identified co-pending U.S. patent application Ser. No. 10/159,676 filed May 31.2002, now U.S. Pat. No. 7,941,047.

The OAM (operation, administration and maintenance) applications are distributed between the NSCs computing platform and the EC and SP controllers. It is illustrated in FIG. 2 as a function of the NSC only for simplicity. Thus, provisioning of managed elements is an SP and NSC activity. The associated CPs specify which modules they contain and stimulate the appropriate object creation at the SP and the determination of the shelf type. Once an appropriate number of interconnected shelves are discovered, as guided by ME (managed element) templates, a ME is created. For amplifiers 8 and OADMs 3 this function is carried out by the SP 30, but for the more complex switched nodes 2, the NSC 40 manages the ME creation. Performance monitoring is performed at both NSC and SP levels.

Each NSC 40 constructs, from queried information, SOC-related information for the embedded elements under its control. The physical, logical and topological data defining all network entities are stored as managed objects in a persistent storage area. This is generically referred as the MIB (management information base) 10, which is in fact distributed throughout the network (see FIG. 3).

A distributed topology server DTS 90 assembles a complete view of the network at each NSC. The network view is maintained in a resource-oriented DTS database 91. DTS 90 *t* also provides application management through interface 95, which enable various network application to access the database 91. The optical path resources, which are necessary for the R&S mechanism to enable end-to-end connection construction, are the transponders, regenerators, wavelength translators, wavelengths, tunable filters/VOA pairs.

The DTS MIB interface 93 is responsible for the creation and deletion of all topological components in the DTS database 91. Interface 93 is informed when all the managed elements in a link have been created, at which point it creates a new link in the DTS database 91. Other topological components such as transponders and regenerators are created immediately upon notification of their creation in the NSC MIB.

The interface 94 is responsible with flooding local DTS information to all other DTS's in the network. It uses for example an OSPF (optical shorter path first) protocol.

For example, R&S control 12 shares this information with neighboring NSC's to build a complete network view for enabling automatic routing and switching and dynamic set-up and removal of connections. Only the local SOC view is stored at this level for access by the management platform 11. The management platform 11 constructs a full network topology by assessing all NSCs and aggregating the SOC information into a distributed topology system.

At the highest level, the management platform 11 provides the compute resources required to perform network management. Typically, it interacts with the NSC platform 17 and a planning platform 13 and a planning platform 13. The management platform comprises a plurality of applications, such as performance, fault, configuration and security management applications. Also the common applications, such as system management and software distribution, may reside on platform 11. The network clients use unique address ranges distributed manually to all NSC's. Alternatively, platform 11 may distribute and maintain these addresses inaccessible to the network client.

Planning platform 13 hosts the planning and engineering, which enable off-line planning and engineering of the network. The constructed network can be shared with the management platform 11 e.g. for optimizing network evolution plans based on most up-to-date network data. Platform 13 also allows the provider to specify the network operating targets such as dispersion, power per channel, channel usage, etc.

A craft platform 19 enables simple nodal management and control of any platform over interfaces to the NSC platform 17 and embedded platform 15. It provides the ability to query and set various nodal parameters, to remotely access and launch management platform applications, etc.

The decision of which software functions reside on which platforms is determined by a number of factors, including response-time requirement, availability requirement, reaction-time requirement, and scalability requirement. A software function may need to reside on more than one platform.

Network Information Model

The following terms are used for the description of the network information model, The term "network element NE" designates a physical piece of equipment that provides a logical communication function. That is, from a physical point of view, a NE comprises one or more shelves; the logical meaning associated with that collection of shelves defines it as a network element. Examples of NEs are the optical amplifiers 8 (pre, post and line), the switch 2 and the OADM 3.

A "managed object MO" is a data structure, which describes the functions and status of a network entity. The managed objects could be both physical MOs (e.g. a shelf, a circuit pack, software, etc) and logical MOs (a connection termination point, a cross-connection).

A managed object has certain attributes and performs certain functions. For example, a cross-connect performs connections set-up or connection release and has attributes such as active cross-connections, fault state, operational state.

A "topology object" is a data structure that describes a connection or a potential connection across the network.

In an object-oriented approach, objects with the same data structure (attributes) and same function (operation) are grouped into a "class".

A "managed element ME" is a managed object that represents a network element.

The term "network management system NMS" refers to the manager of a network which allows the user to interface with the NOS 1. The NMS and NOS communicate using the information stored in the managed objects.

The term "mastered" means that the respective master entity is responsible for maintaining the definitive state of the object, which implies ensuring that the object can be restored under any circumstance.

This invention defines a network model (or core network model, or network information model) that is common to all applications, and shows how the information is maintained and used in the network. The core network model is divided into two models, a network element NE information model and a topology information model that are largely independent form each other. These models are however associated with each other; namely the topology model references objects of the NE model as seen later. Use of a network information model enables extensions to meet the needs of specific applications. The models use a universal object description language; the NMS, NSC and embedded groups all generate their interface and code from this common language. Extensions are grouped into packages to simplify their inclusions and exclusions from applications. Applications are able to derive or add their own extensions including new derived classes or attributes.

Managing the topology information independently from the information on the network elements that form the network, allows each model to evolve independently, a model to exist without the others and maps well to the separation between the network management layer NML and element management layer EML concept in the telecommunication management network TMN protocol.

Figure 3:
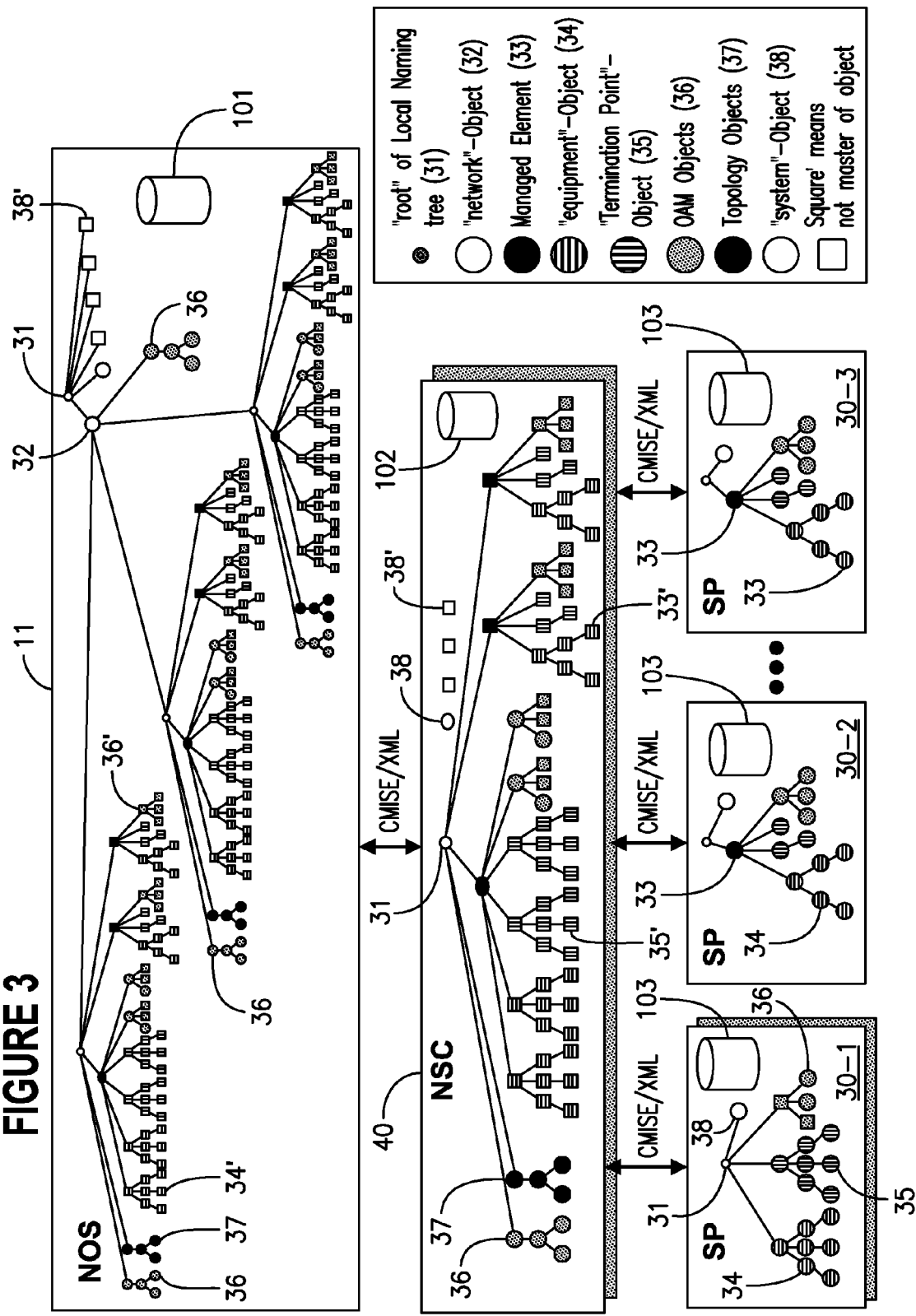
FIG. 3 illustrates the residence of various managed objects in the network operating system of FIG. 2.

FIG. 3 shows the residence of various MOs in the NOS shown in FIG. 2, and how they are mastered. It shows a NSC 40 and the NEs in its SOC, namely a switch shelf 30-1 and two amplifier shelves 30-2 and 30-2, each equipped with a respective shelf processor 30. It is to be understood that this is an example, a NSC 40 may control a larger number of optical amplifiers, the NEs generally occupy more than one shelf, and also an NSC may control more switches at the same site.

The objects shown in FIG. 3 are:
Network objects 32 (shown in white), which in this case is an object representing network 100.
Managed elements 33 (shown in black). Examples of MEs are a switch, an OADM, the line amplifiers in the span of control of a respective NSC 40, etc.
Equipment objects 34 (shown in horizontal stripes). In the case of a line amplifier, these could be the two EDFA amplification stages, the Raman stage, the DCM module and the dynamic gain equalizers (DGE).
Termination point objects 35 (shown in vertical stripes). A termination point can be for example the termination of a channel (transmitter, receiver). In the case of a line amplifier, such an object represents termination of the optical line; while the WDM signal output from the line amplifier has the same channels as the WDM signal input to the line amplifier, it has different parameters (gain, distortion, tilt, OSNR).
OAM (operation, maintenance and administration) objects 36, shown in gray. These are logical MOs, including the operational parameters of the respective equipment objects.
Topology objects 37 (shown in dark gray). These are for example objects managed by the routing and switching mechanism at the respective NSC.
System objects 38 (shown in light gray) represent the processing platforms.

Objects that are shown by circles are mastered at the level where they are illustrated, while the objects that are not mastered at that level are represented by squares. For example, in the case of a switch NE, the SP aggregates the equipment and the termination objects only; the OAM and topology objects are mastered by the NSC.

At the embedded level 15, a shelf processor 30 is the master of all equipment and termination objects local to that shelf, and also for the OAM objects in line or post/preamplifiers. A SP is also the master for all objects subtended by these objects, namely the respective slots, optical modules, etc. Each SP provides persistent storage for the MOs it masters, shown at 103.

The network services controller NSC 40 manages all network elements within its SOC, such as the optical amplifiers 8 (includes line, pre and post amplifiers), switches 2, and OADMs 3. At this level, a managed element is in general a network element. A managed element complex MEC may also be supported at this level (a MEC is for example a switch 2, the drop side of the access system and the OE converting side of the electro-optics system). The NSC is the master of the "local" OAM objects 36, such as software distribution packages, and topology objects 37. It also provides persistent storage as shown at 102 for the objects it masters.

The management platform is the master for the network object 32 and it is responsible for all common functions such as the functions that cross platforms, like security, data and system management, and also for managing all the NSCs. The management platform logically groups the network elements into subnetworks based on a customer's desired network partitioning. This platform is also the master of the "local" OAM objects 36 as software distribution packages. It provides persistent storage for the objects it masters; the remaining objects are a "mirror" of the actual network state.

To platform 11 all MOs within an NSC's span of control (SOC) are located in the MIB of the respective NSC 40. The fact that the MIB is actually distributed between the NSC and several shelf processors is hidden from the client.

All MOs in the network information model are hierarchically named, in a rooted hierarchy according to some basic rules. Thus, an object can only exist if its "parent" exists, and an object can have only one parent. A "local distinguished naming scheme" is used, where each domain has its own relative root object from which all objects are named. The NMS domain has a root object 31 for the entire naming tree. Objects in the management platform domain carry a full distinguished name (DN). Objects in the NSC domain carry a local distinguished name (LDN) relative to the network, and the objects in the SP domain carry a LDN relative to the node.

Distinguished names DN are an ordered list of so called "tuples" (ClassID, InstanceID). For example, a circuit pack in slot 5 of shelf 3 in an amplifier named 12345 would have a distinguished name in the NSC of: {(ME,12345)→(EquipmentHolder,3)→(EquipmentHolder,5)→(CircuitPack,1)}
Since each class also has an associated ID, the actual DN looks like: {(1,123456)→(3,3)→(3,5)→(4,1)}

1. Network Element Information Model

The primary function of the NE information model is to model the NEs based on the managed objects (MO) they contain, and specifically not to model the network topology in which that NE participates; network topology is modeled separately.

The NE information model is based in general on the M.3100 ITU-T standard, Generic Network Information Model, which defines the ME (managed element) physical and logical components. G.875 Standard defines optical-specific extensions to M.3100.

In M.3100 style interfaces the NMS creates and names each ME. Auto-creation of all of the MOs is one aspect of the invention, and it does impact on the M.3100 model. Firstly, it saves a significant amount of manual data entry and secondly, it avoids many-human errors. The MO's names, which are auto-generated when the object is created, may not be in a form that is optimal for the network provider. For example, network providers typically name their network elements in a meaningful way that cannot be auto-generated, To resolve this issue, the NE interface supports a "UserLabel" attribute that the service provider can assign for human interpretation, for example on alarms and GUI (graphical user interface) displays.

The NE information model is based on the physical and logical MOs that the respective NE contains and their inter-relation.

Figure 4A:
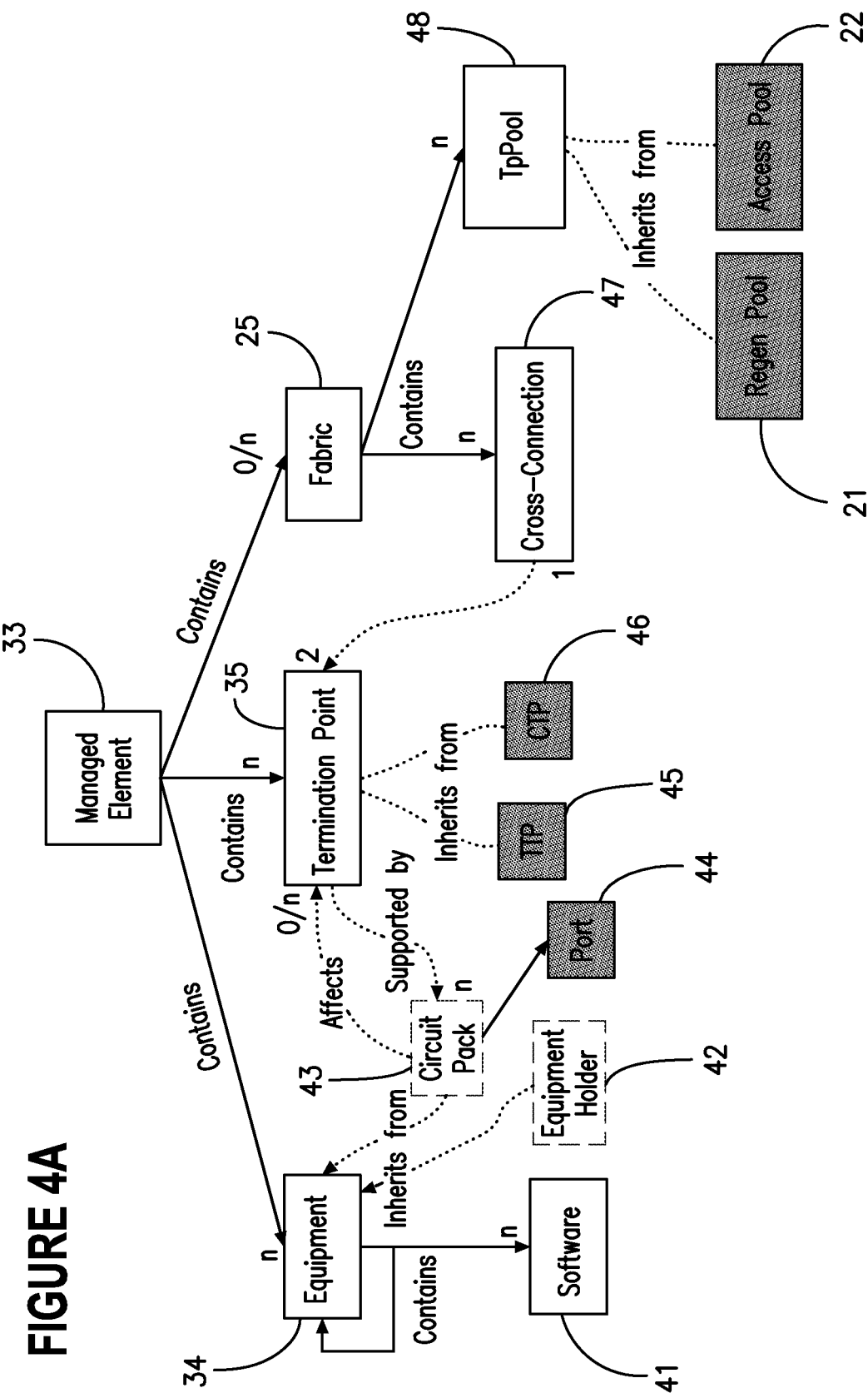
FIG. 4A shows the network element information model.

FIG. 4A shows the general NE information model used in network 100, illustrating the differences from the M.3100 standard in gray. The model comprises equipment objects 34 (there could be n such objects), termination point objects 35, and fabric objects 25. An equipment object subtends software objects 41, equipment holder objects 42 and circuit pack objects 43. It is to be noted that n shown on the arrows between the managed objects may have a different value for each object.

In this model, a port class 44 was added to model the inter and intra shelf adjacency of cards within a managed element (the physical cabling between the cards and between shelves), as seen later in connection with FIG. 5B.

A termination point object 35 could be a tail termination points TTP 45 or connection termination points CTP 46, depending on the current routing map.

The trail termination points TTP 45 are implemented for the optical path (OP1, OP2 in FIG. 1); unlike traditional DWDM networks, an optical path (channel) is not terminated (OEO converted) at the next node. There is a TTP 45 for each channel on a link, as shown by letter n.

Because of its associations with other objects, a connection termination point (CTP) 46 is an important MO in the NE interface model. The CTP is where the "logical" is mapped to the "physical" via a "supported by" relationship with the circuit pack 43 and it is also where the topology information model (see next) maps to the NE interface model via a relationship attribute with a topology object 37. The CTP 46 can be cross-connected (i.e. switched) with another CTP using the cross-connection object 47.

The objects subtended by the fabric 25 are the cross-connection object 47 and the topology pool (TpPool) 48. The fabric object 25 is the container for all cross-connection objects 47. The TpPool object subtends a regenerator pool class 21 and an access pool class 22, which are extensions to the standard. As discussed in connection with FIG. 1, network 100 is provided with a number of regenerators 7 and the respective access equipment 4, which are dynamically allocated to connections according to the current connectivity map of the network, and to the performance of individual connections.

The functional MOs of the NE information model are similar to the MOs in the standard, which defines an alarm management schedule class, a log class, an alarm severity assignment class and an alarm summary class. In addition to these MOs, the functional MOs also include according to the invention a performance record class and a security record class contained in the log class.

Each managed object maintains a list with the classes it contains, objects it affects, supports and inherits from.

Figure 4B:
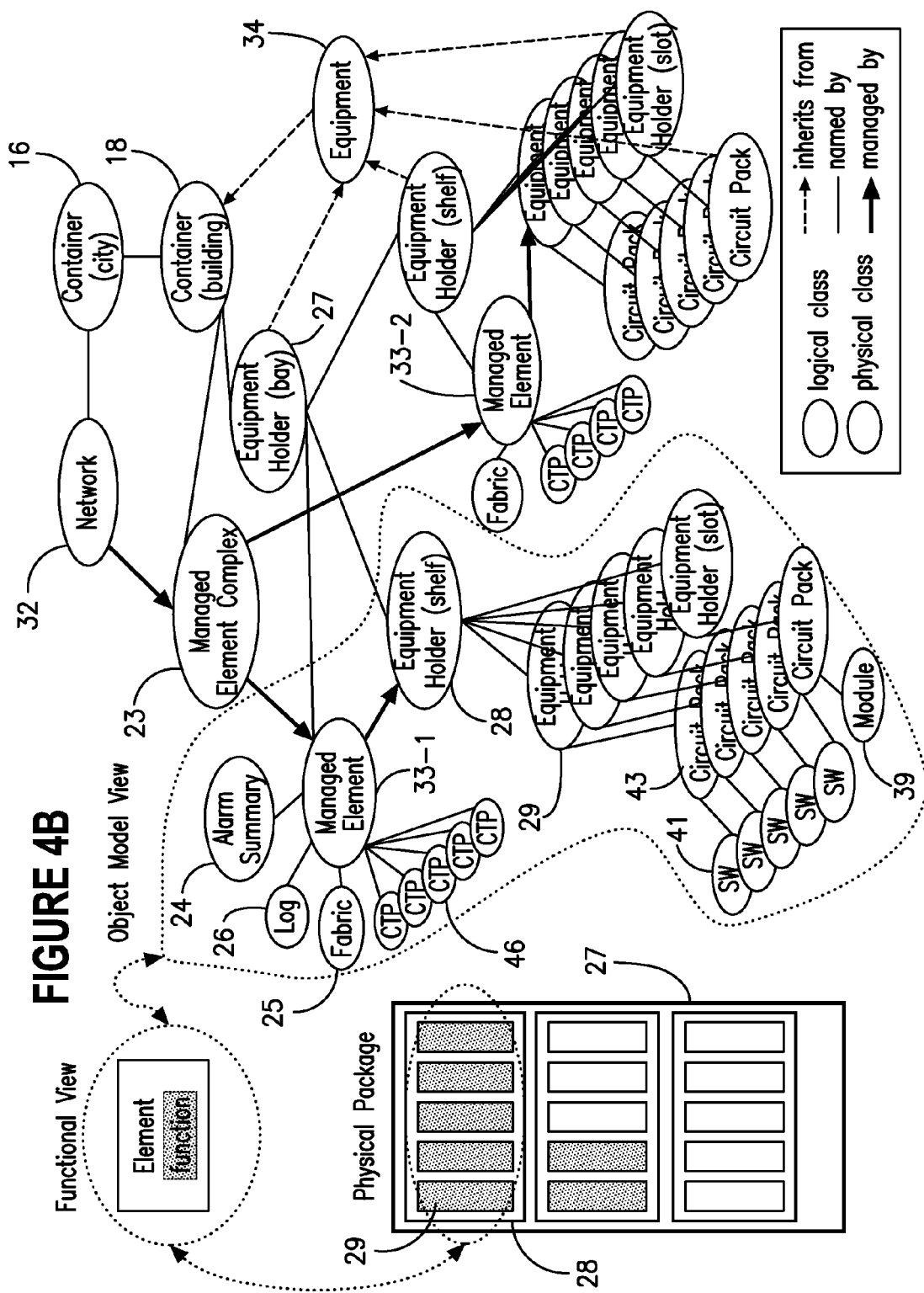
FIG. 4B shows a generic managed element.

FIG. 4B shows an example of a NE information model for a managed object complex (MEC), for exemplifying the relationship between various classes in the NE information model. In this example, MEC 23 has two managed objects 33-1 and 33-2, each having the respective physical classes, shown in white, and logical classes, shown in gray. For example the physical classes shown are bays, shelves and slots equipment holders 27, 28 and respectively 29, circuit pack 43, optical modules 39. The logical classes shown are alarm summary 24, log 26, fabric 25, CTPs 46, software 41. In this representation the equipment holder 42 of FIG. 4A is shown in more details to represent hierarchically the bays, shelves and slots. In addition, FIG. 4B also shows the city container 16 and building container 18 which "contain" the equipment holder bay 27 for both managed elements of MEC 23. The equipment holders are also shown on the left side of the drawing. The equipment class 34 "inherits from" all equipment holders, as shown by the dotted lines, and the container 18 "inherits from" the equipment 34.

The thin lines between the classes illustrate hierarchically the naming entity. For example, the ME 33-1 "names" the CTPs 46, the fabric 25, the log 26 and the alarm summary 24. The thick lines show the "managed by" relationship. Thus, MEC 23 "manages" ME 33-1 and 33-2, and each ME in turn manages an equipment holder (shelf or slot). Network object 32 manages MEC 23.

Figure 5A:
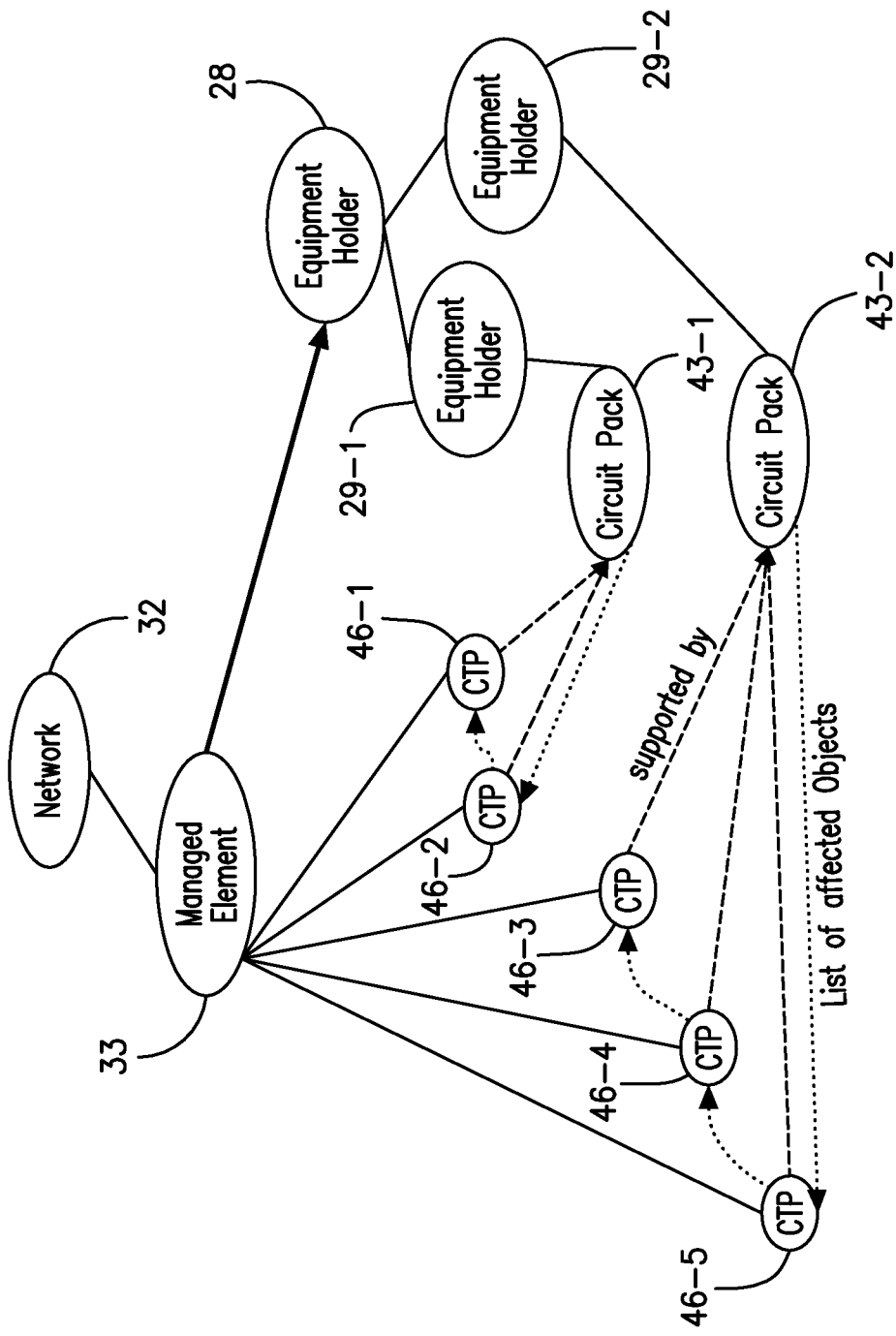
FIG. 5A illustrates the relationship between the connection termination points and the circuit pack objects.

FIG. 5A illustrates the relationship between the connection termination point objects 46 and the circuit pack objects 43. A circuit-pack points to a list of objects "affected by" it. Thus, circuit pack 43-1 maintains a list with CTP 46-1 and CTP 46-2, and the "affected by" list maintained by circuit-pack 43-2 shows CTP 46-3, 46-4 and 46-5. A CTP points to the circuit pack that it is "supported by". For example, CTP 46-3 points to circuit pack 43-2. The CTPs on the same CP are also affected by other CTPs on the same card pack. Thus, CTP 46-3 is "affected by" CTP 46-5 and CTP 46-4. The "supported by" relationship is shown in dashed lines, and the "affected by" relationship is shown in dotted lines. The thick line shows that the ME 33 manages equipment holder 28.

Figure 5B:
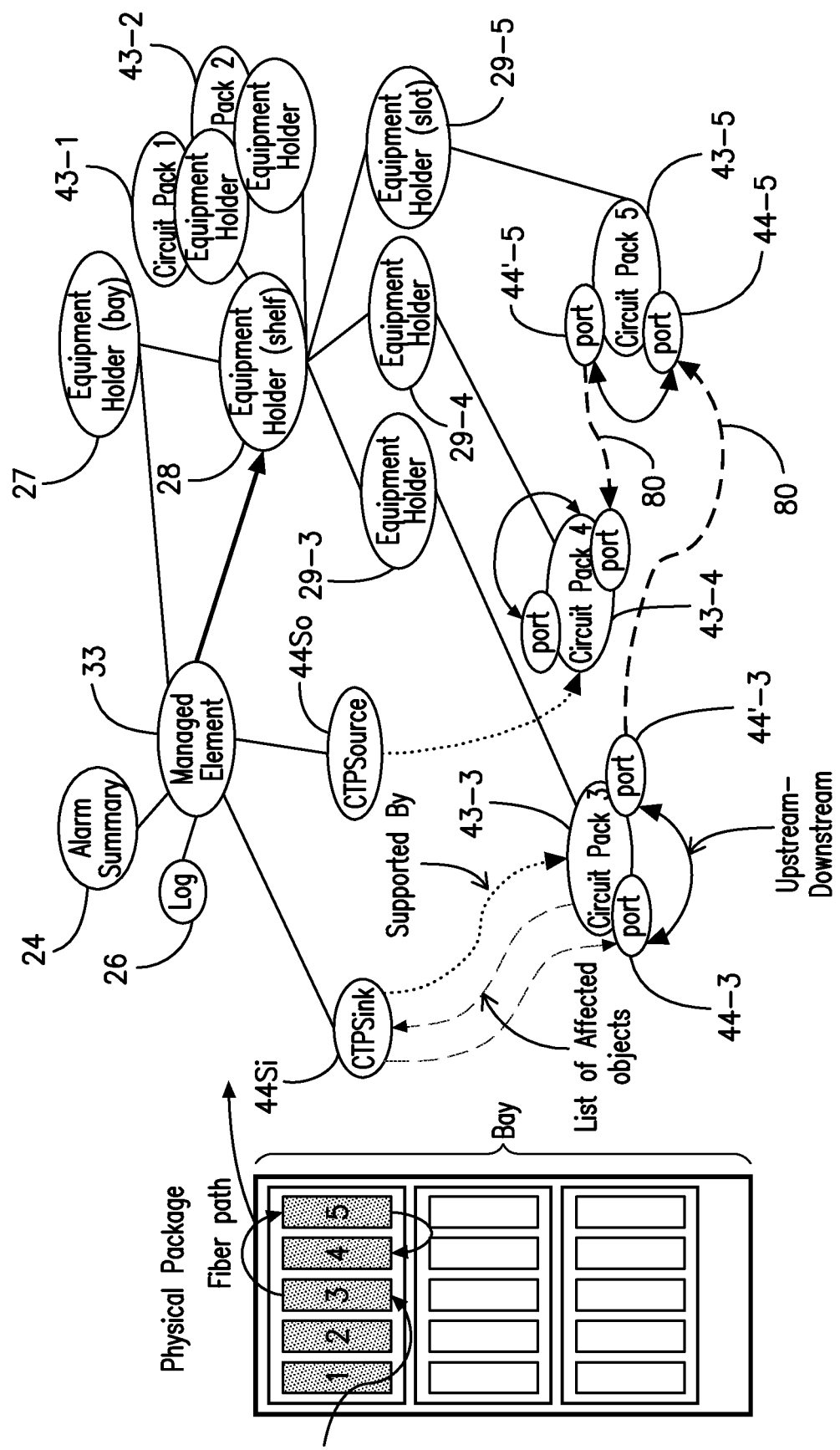
FIG. 5B shows circuit pack adjacency.

FIG. 5B shows circuit pack adjacency. Circuit pack adjacency is accomplished by trace information 80 that flows in one direction from port to port, between a CTP source 44So and a CTP destination 44Si. In this example, as shown on the left side of the drawing, the fiber and the trace channel (which travels on the same fiber with the WDM signal or on a tandem fiber) enter the shelf at circuit pack 43-3 in slot 3 and exit at circuit pack 43-4 in slot 4, after passing through circuit pack 43-5 in slot 5. The CTP for the optical trace channel can locate an "associated port" by first locating the CP via the "supported by" list, and then traversing the list of "affected objects". The relationship between the ports 44 and 44' on each card is "upstream-downstream" since the trace flow is unidirectional.

Figure 5C:
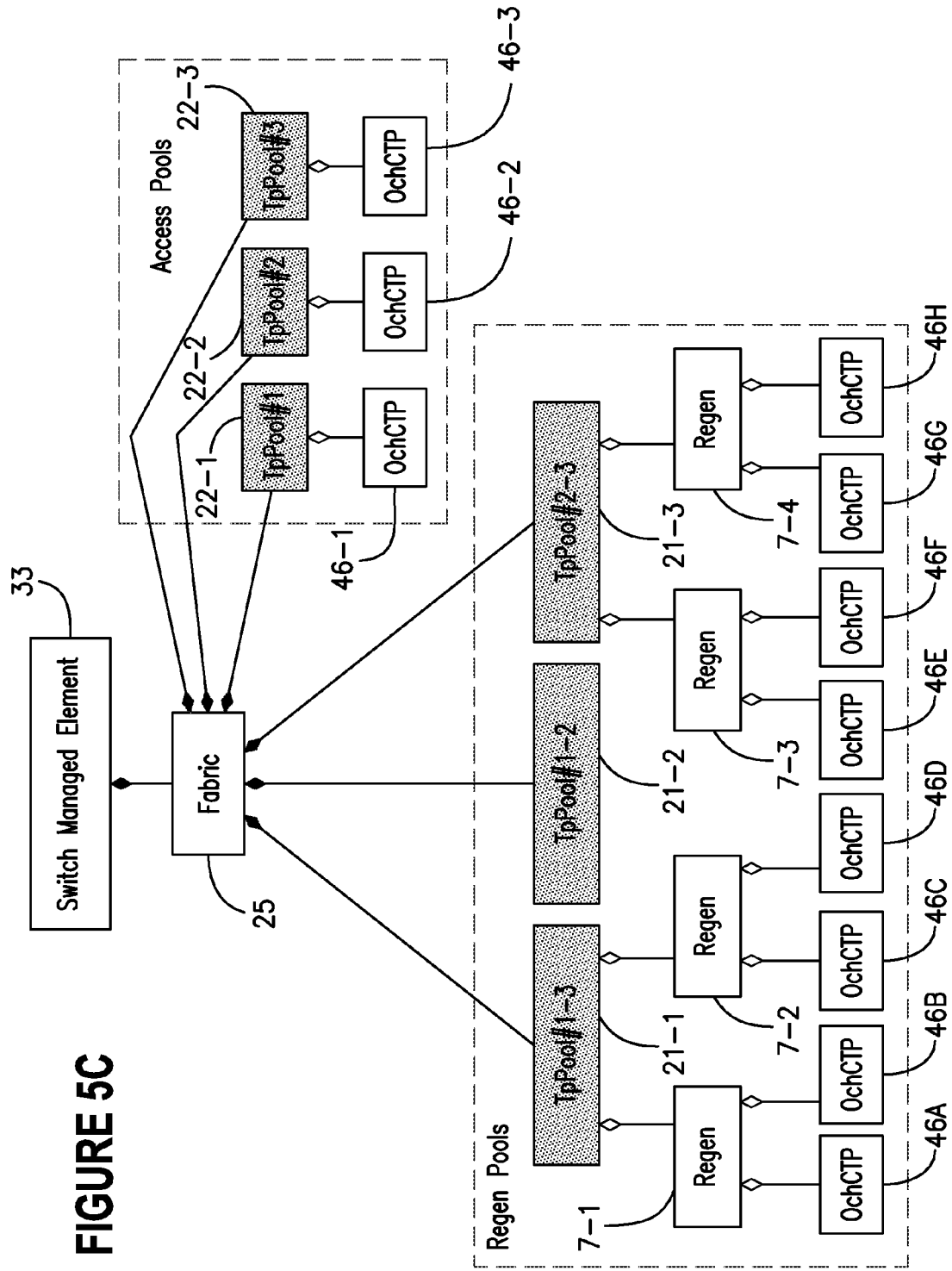
FIG. 5C is an example of modeling regenerator and access pools for a 3×3 switching node.

FIG. 5C is an example of modeling regenerator pools and access pools for a 3×3 switching node. As shown in FIG. 4A, the fabric object 25 "contains" n TpPool objects 48, which, according to the invention, "inherits from" access pool class 22 or/and regenerator pool class 21.

A 3×3 switching node has three input and three output lines, each line provided with a respective add/drop structure 4, shown by access pools 22-1, 22-2 and 22-3. As an optical channel originates and terminates on a transponder connected to an access route, these connection termination points are shown at 46-1, 46-2 and 46-3 respectively. The black rhomb at the fabric object indicates that the fabric contains and references the respective objects.

The regenerator pools 21-1, 21-2 and 21-3 illustrate the pools that are connected between input and output lines 1-3, 1-2 and 2-3 respectively. In this example, there are four regenerators, regenerators 7-1 and 7-2 connected between lines 1-3 for both directions, and regenerators 7-3 and 7-4 connected between lines 2-3 for both directions. The regenerators have two CTPs 46, since each terminates an optical path and originates a new optical path; however the trail is not terminates and it continues on the same or another channel.

2. Topology Information Model

The topology information model is based on the M.3100 Amendment 1 standard, which itself is based on G.805 ITU-T standard. The primary function of this model is to model the topology of the network and specifically not to model the network elements that implement the topology. As indicated above, the topology information model does maintain associations with the NE model to facilitate mapping between the two views.

The definition of the terms used for the network topology model is provided in connection with FIGS. 6a-6f. These figures show the classes of objects used for this model (see 37 on FIG. 2). Namely the topological components are shown in FIGS. 6a-6d, and the transport entities are shown in FIGS. 6e and 6f.

The topological components express the static interconnections between network components. FIG. 6a shows the topological components as defined by the standard:

A layer network 50.

An access group, such as 51A and 51B. A layer network 50 describes a complete set of like access groups 51A, 51B, which may be associated for the purpose of transferring information. Access groups describe co-located trail termination functions connected to the same link or subnetwork.

A subnetwork 52A, 52B, which describes the potential for subnetwork connections.

A link 53A, 53, 53B, which describes the fixed relationship between subnetworks 52 or access groups 51 and subnetworks 52 and may contain plurality of link connections.

A link end 54, which describes the capacity of the ends of the link.

The subnetworks 52 can be recursively partitioned into interconnected subnetworks and links 53. This nesting ability means that the details about parts of the network can be hidden or abstracted.

FIGS. 6b to 6d show how a detailed network can be abstracted recursively within more abstract partitioned subnetworks until ultimately the entire layer network is represented by a single subnetwork. The example of FIG. 6b shows a layer network encompassing subnetworks 52-1 to 52-5 connected by links 53. Access groups 51C, 51D and 51E represent the trail termination functions connected to links 53C, 53D and 53E, respectively. FIG. 6c shows how subnetworks 52-1 and 52-3 are abstracted into a partitioned subnetwork 52C and subnetworks 52-2 and 524 are abstracted into a partitioned subnetwork 52D. In FIG. 6d, subnetworks 52C, 52C and 52-5 are abstracted into a single partitioned subnetwork 52, which includes all the links between the subnetworks 52-1 to 52-2.

The transport entities include:

A trail 60, which is responsible for modeling the client layer traffic between the source point A and the destination point Z.

A subnetwork connection, as shown at 62BC and 62 DE, which is responsible for modeling the traffic across a subnetwork; and A link connection, as shown at 63A, 63, and 63Z, which is responsible for modeling the traffic across a link.

The extension to the standard refers to the network termination points 65. Namely, the standard specifies that an 'adaptation function' and a 'termination function' terminate an optical path. These functions are replaced in the topology information model according to the invention with the network termination points, with a view to enable a universal common model across the processing platforms. The function of the network termination points in the topology information model is to bind together the transport entities to form the respective end-to-end trail.

In the topology information model, a trail termination point TTP 65 terminate an end-to-end trail 60 (source A to destination Z), and is contained in an access group 51, while a connection termination point CTP 66 terminates a link connection 63 and is contained in a link-end 54.

The telecommunications networks tend to use many different technologies to actually carry traffic across an end-to-end connection. That is, the actual transport network can be decomposed into a number of independent layer networks with a client/server relationship between adjacent layer networks.

FIG. 6f shows the client/server relationship between layer networks 70 and 71 used in the context of the topology model according to the invention. In server layer 71, the CTPs 66B, 66C, and 66D, 66E bind the link connections 63 to the subnetwork connections 62BC and respectively 62DE, and the TTPs 65 bind connection termination points 66', 66" in the client layer network 70 to the trail 60 in the server layer network 71. In client layer 70, the CTP 66' and 66" bind the link connection 63'. Link connection 63' in client layer network 70 is implemented by a trail 60 in the server layer network 71. This can be realized by associating CTP 66' in the client layer 70 with a TTP 65 in the server layer 71.

A basic topology information model implements the first three layers of an optical network, namely the Optical Channel (Och) layer network, the Optical Multiplex Section (OMS) layer network, and Optical Transmission Section (OTS) layer network. More complex models can go at the lower levels, to include the Physical Media (Phy) layer network and also, an additional layer (not defined by the standard), the Conduit layer network.

The Och layer network provides end-to-end networking of optical channels for transparently conveying client information of varying formats. The OMS layer network provides functionality for networking of a multi-wavelength optical signal. The capabilities of this layer network include ensuring integrity of the multi-wavelength OMS adapted information, and enabling section level operations and management functions, such as multiplex section survivability. The OTS layer network provides functionality for transmission of optical signals on optical media of various types. The capabilities of this layer network include ensuring integrity of the optical transmission section adapted information and enabling section level operations and management functions (such as transmission section survivability).

The Phy layer network models the cable in which the fibres are contained, and the Conduit layer network models the physical conduit in which a cable runs.

This basic topology information model assumes that an OTS link is in a one-to-one relationship with a Phy link, which is in a one-to-one relationship with a conduit link. In this case, additional attributes are kept on an OTS Link to characterize information that would normally belong to a lower layer. It is understood that this is not a completely accurate model but it does allow the system to take advantage of many of the benefits normally provided by the lower layers. For example, a Conduit Id can be maintained at the OTS Link to capture a simplified view of the conduit in which a fiber it contained.

Figure 7A:
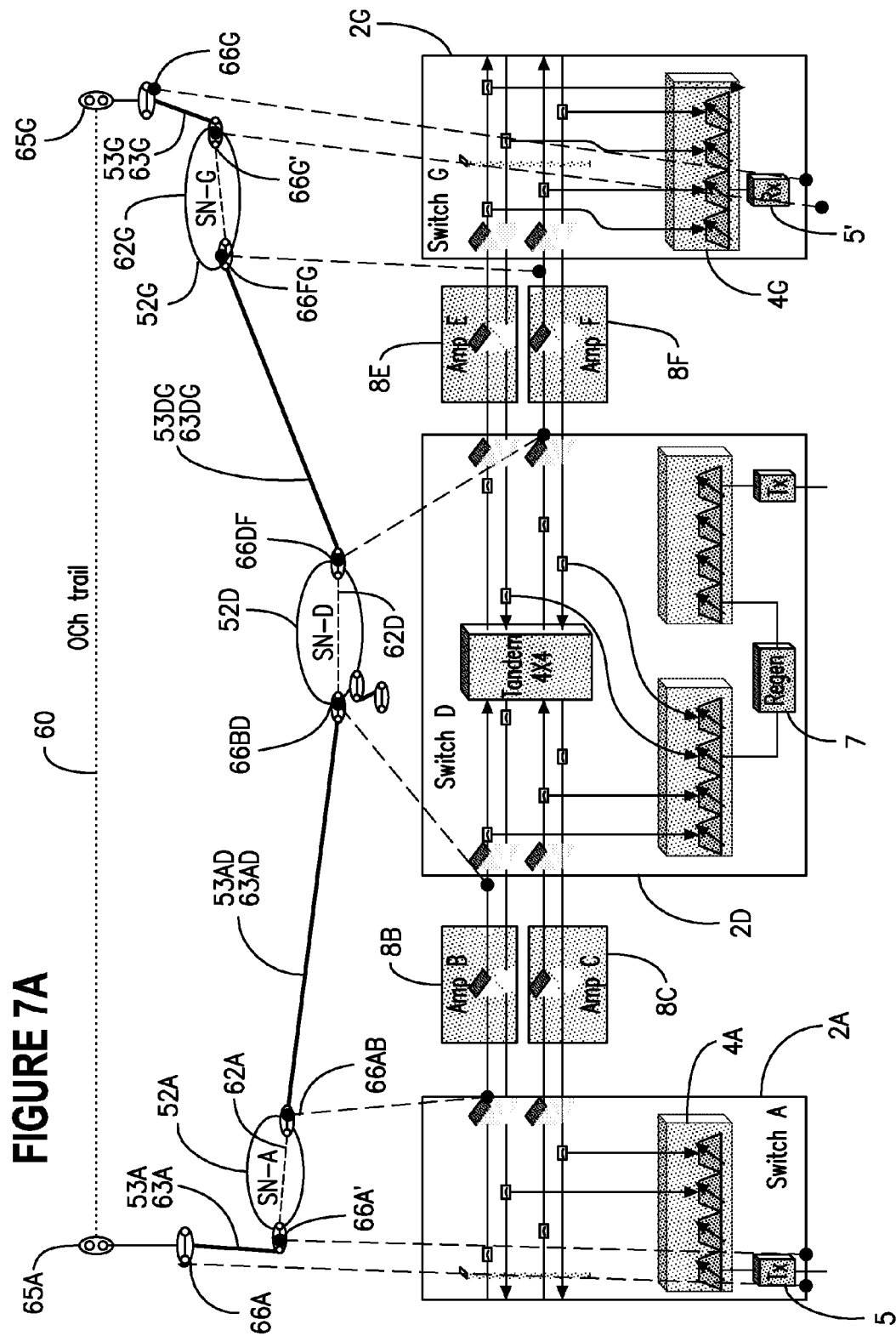
FIGS. 7A-7C show an example of a topology model for a network fragment, where

FIG. 7A shows an example of a trail at the optical channel layer (Phy) for illustrating how a topology information model is built, using topological components, transport entities and termination points. The fragment of network of interest for this example includes two bidirectional lines 9-1 and 9-2 connecting nodes A, D and G. Bidirectional optical amplifiers 8B and 8E are provided between nodes on line 9-1, and bidirectional optical amplifiers 8C and 8F, on line 9-2. FIG. 7A also shows a trail 60 that originates at node A, is switched by intermediate node D from a line 9-1 to line 9-2, and terminates at node G. The traffic on this connection is conditioned by the respective optical amplifiers 8B and 8F. Only the add side and the respective transmitter 5 are shown at node A, and the drop side and receiver 5' are shown at node G.

The topological objects at the optical channel layer are subnetworks 52A, 52D and 52G for each respective switch, connected respectively by links 53AD and 53DG. Links 53A and 53G connect the subnetworks 52A and 52G to the respective access group.

The transport entities are the subnetwork connections 62A, 62D and 52G, and the link connections 63AD and 63DG. The optical amplifiers are abstracted in the links at this level.

The network trail termination points in this example are 65A and 65G at the ends of trail 60. The network connection termination points are denoted as in FIG. 6e with 66, and they terminate the link connections and are contained in the respective link ends.

Figure 7B:
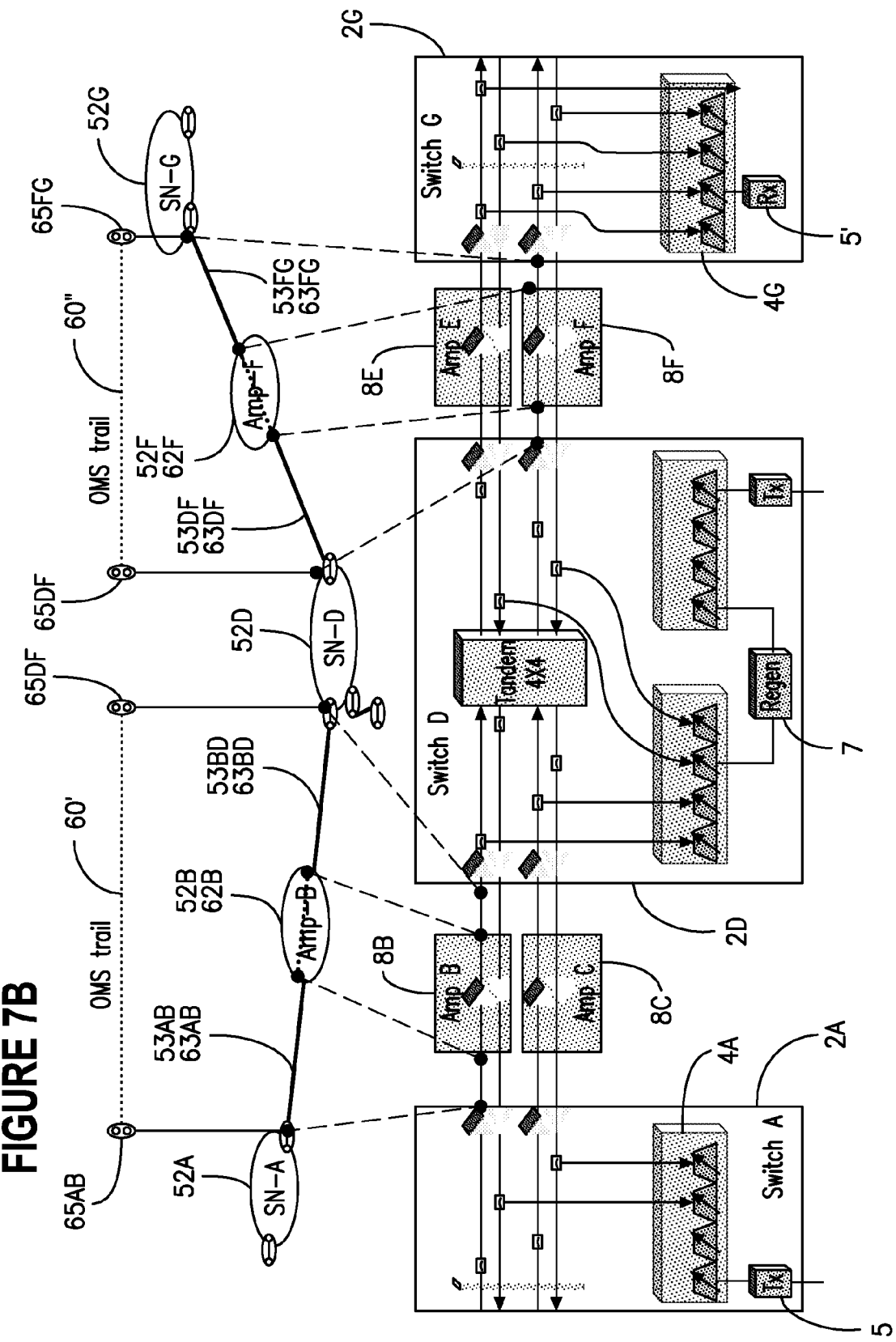

FIG. 7B shows the model of the same network fragment as in FIG. 7A at the optical multiplex section level. At this level, there are two OMS trails 60' and 60", and the links 63AD and 63DG are now shown more detail. Namely, the optical amplifiers 8B and 8F are represented by topological components subnetworks 52B and 52F respectively, and their transport entities subnetwork connections 62B and 62F. The trail termination points for OMS trail 60' are 65AB and 65BD and for OMS 60" are 65DF and 65FG at this level. The connection termination points for the link connection are not illustrated at this level, but they are as before at the ends of each link 53AB, 53BD, 53DF, and 53FG.

Figure 7C:
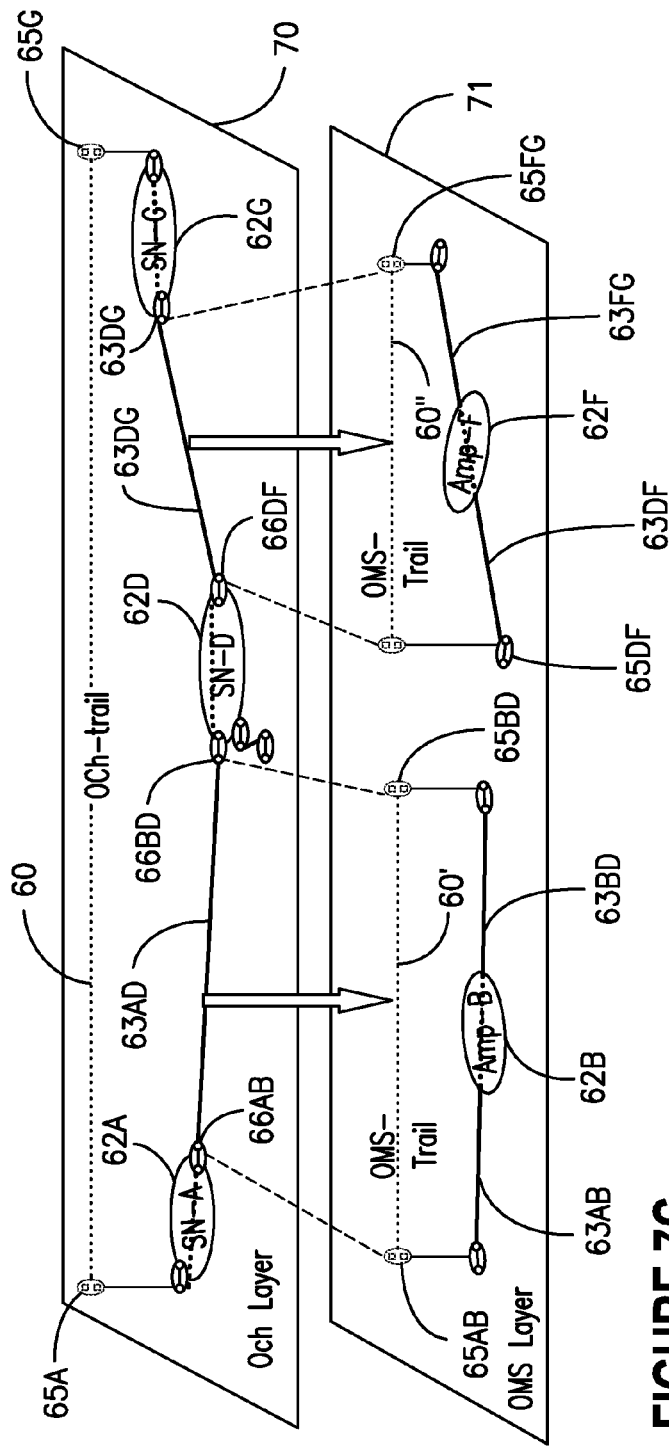

FIG. 7C shows the layered model that binds the optical channel layer network 70 to the OMS layer network 71 in a client-server relationship, where network 70 is the client layer and network 71 is the server layer. Now, the link connections 63AD and 63DG in the client network 70 are implemented by a respective OMS trail 60', 60" in the server layer 71. Thus, within the server layer 71, the link connections 63AB and 63BD bind the subnetwork connection 62B to trail termination points 65AB and 65BD respectively, and link connections 63DF and 63FG bind the subnetwork connection 62F to trail termination points 65DF and 65FG respectively. The OMS trail termination points 65AB and 65BD bind the respective optical channel connection termination points 66AB and 66BD in the client layer network 71 to OMS trail 60'. Similarly, the trail termination points 65DE and 65FG bind the respective connection termination points 66DF and 66FG in the client layer network 71 to OMS trail 60'.

It is to be noted that the topological components are created only after network commissioning. The link objects contain a list of connection termination points at each end, which bind to subnetwork connections only when a path is created. The access groups contain trail termination points that will terminate an end-to-end trail when required.

The system management actions cause topology objects of the optical channel layer, specifically the transport entities, to be created, deleted and updated. For example, as connections are established the appropriate trail 60, CTP 66, TTP 65, subnetwork connections 62, and link connections 63 are created in the optical channel layer. This is the only mechanism in the network that creates these topology objects.

Figure 8A:
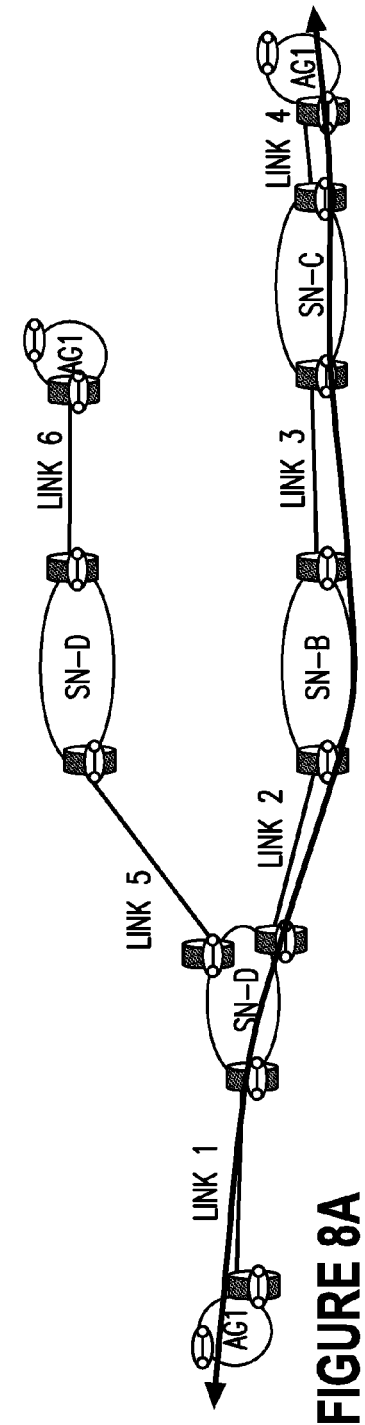
FIGS. 8A and 8B show the topological model objects, where

FIG. 8A is an example showing the topological components for a trail A-C established over a network comprising nodes A, B, C and D. For simplification, the subnetworks illustrating the nodes are designated by SN-A, SN-B, SN-C and SN-D, the links between the subnetworks are designated with link1 to link6. The access groups, designated with AG1 and AG2 are shown at nodes A and C respectively, since the connection originates at node A and terminates at node C.

Figure 8B:
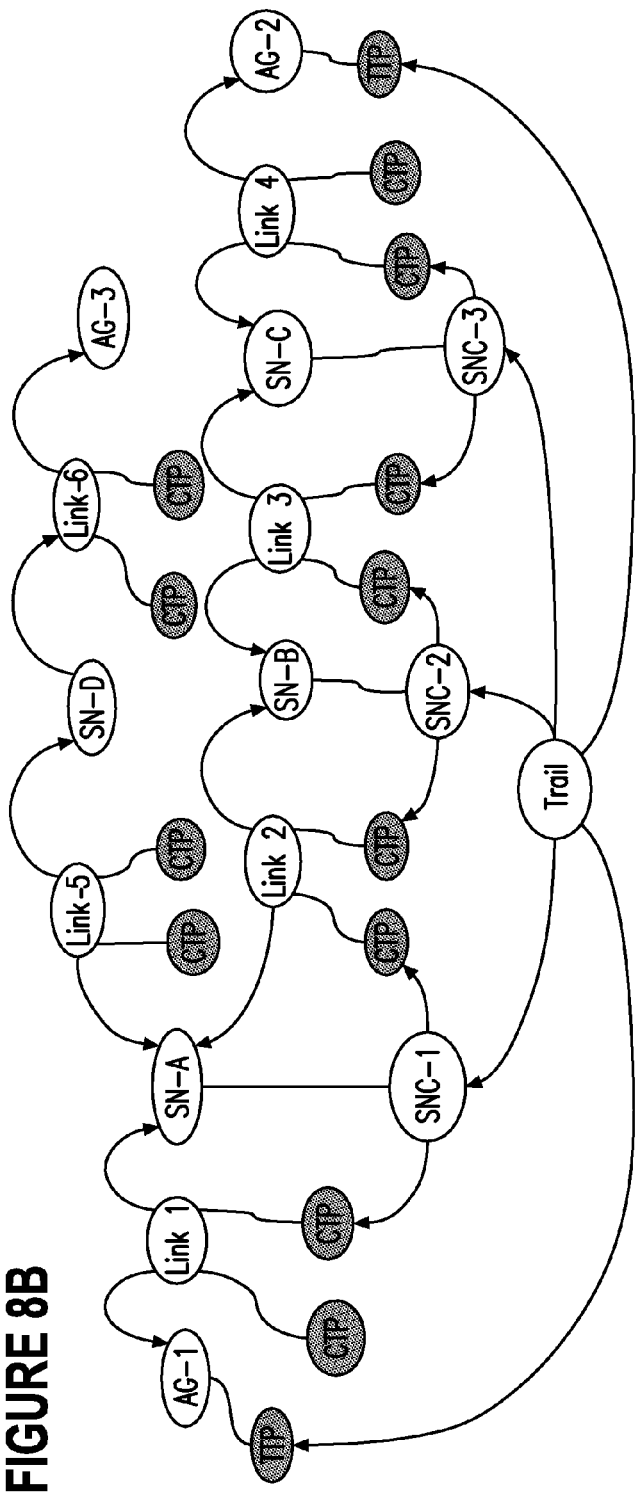

FIG. 8B illustrates the topology model for the network fragment shown in FIG. 8A. Transient subnetwork connections SNC are created on the subnetworks SN-A to SN-D. These SNCs are grouped together in trails to define an end-to-end connection. The CTP bind the subnetwork connections to the links. Trails are referenced by a client link to gain access to the server layer that implements it. A link may point to one or more trails.

Figure 9A:
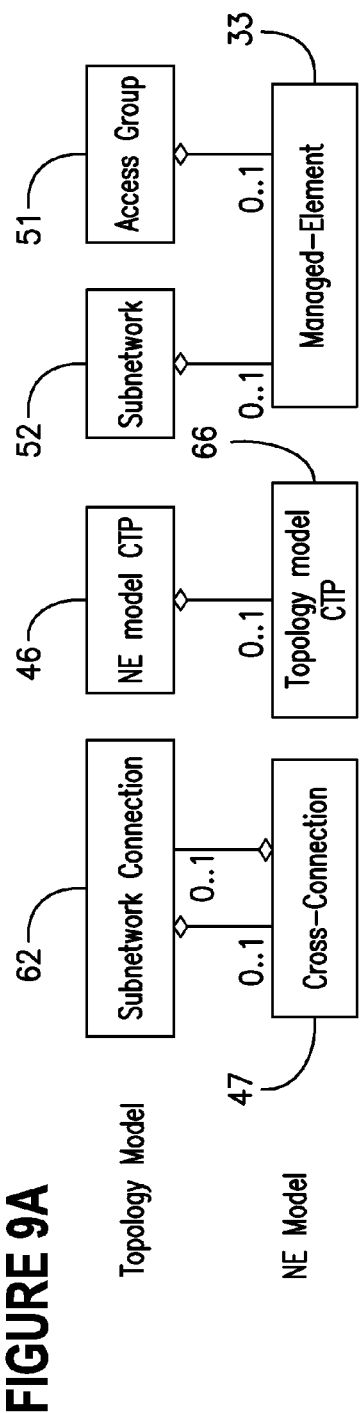
FIG. 9A illustrates the possible association between the NE information model and topology information model and FIG. 9B shows the association for the example of FIG. 8A.

Although the above NE and topology models are specified separately, there are some inter-dependencies between them. Thus, there is a one-way association between the Network CTP class of the topology model and the CTP class of the NE information model. FIG. 9A show the only possible associations between the NE information model and topology information model. This association is used to relate the topology view to the network element implementation view. In the network model, a topology network CTP object 66 can be associated with an NE CTP object 46. Also, a topology subnetwork 53 or access group object 51 can be associated with a NE managed element 33. These are one-way associations. A topology subnetwork connection object 62 can be associated with a NE cross-connection object 47. This is a 2-way association. In this way, the NE objects maintain the network implementation details (e.g. wavelength, power, BER, alarms). Topology objects maintain generic connectivity information (e.g. trail ID, CallId, Reservation Status). Only the cross-connection object can navigate between the two models.

Figure 9B:
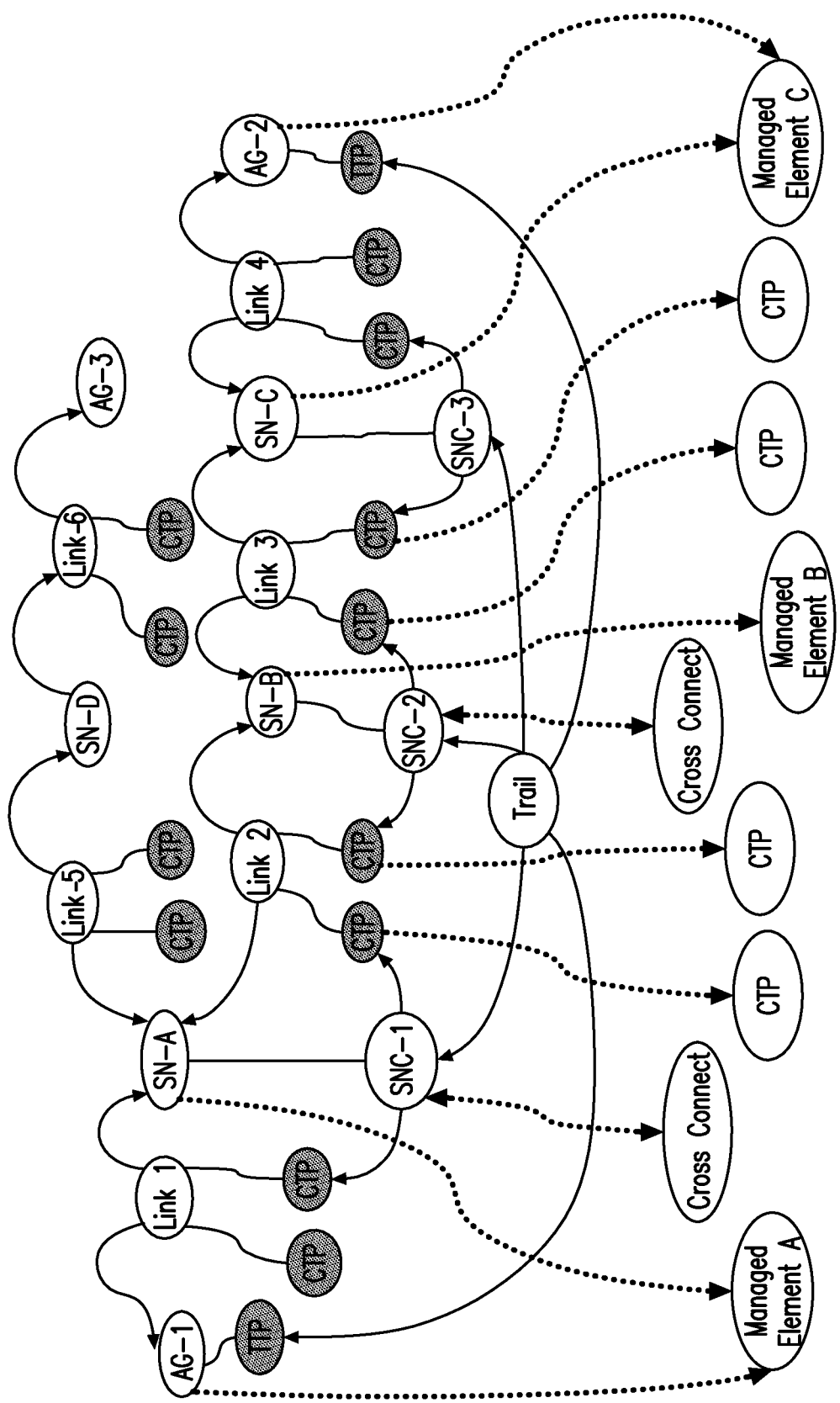

FIG. 9B illustrates the association between the models for the network fragment of FIG. 8A. The objects of the NE information model are shown with horizontal stripes, and the dotted lines indicate the association between the models. Also, for simplicity the objects the NE information model are called "managed objects", and the objects the topology information model are called "topology objects"

3. NMS-UNI Information Model

Figure 10:
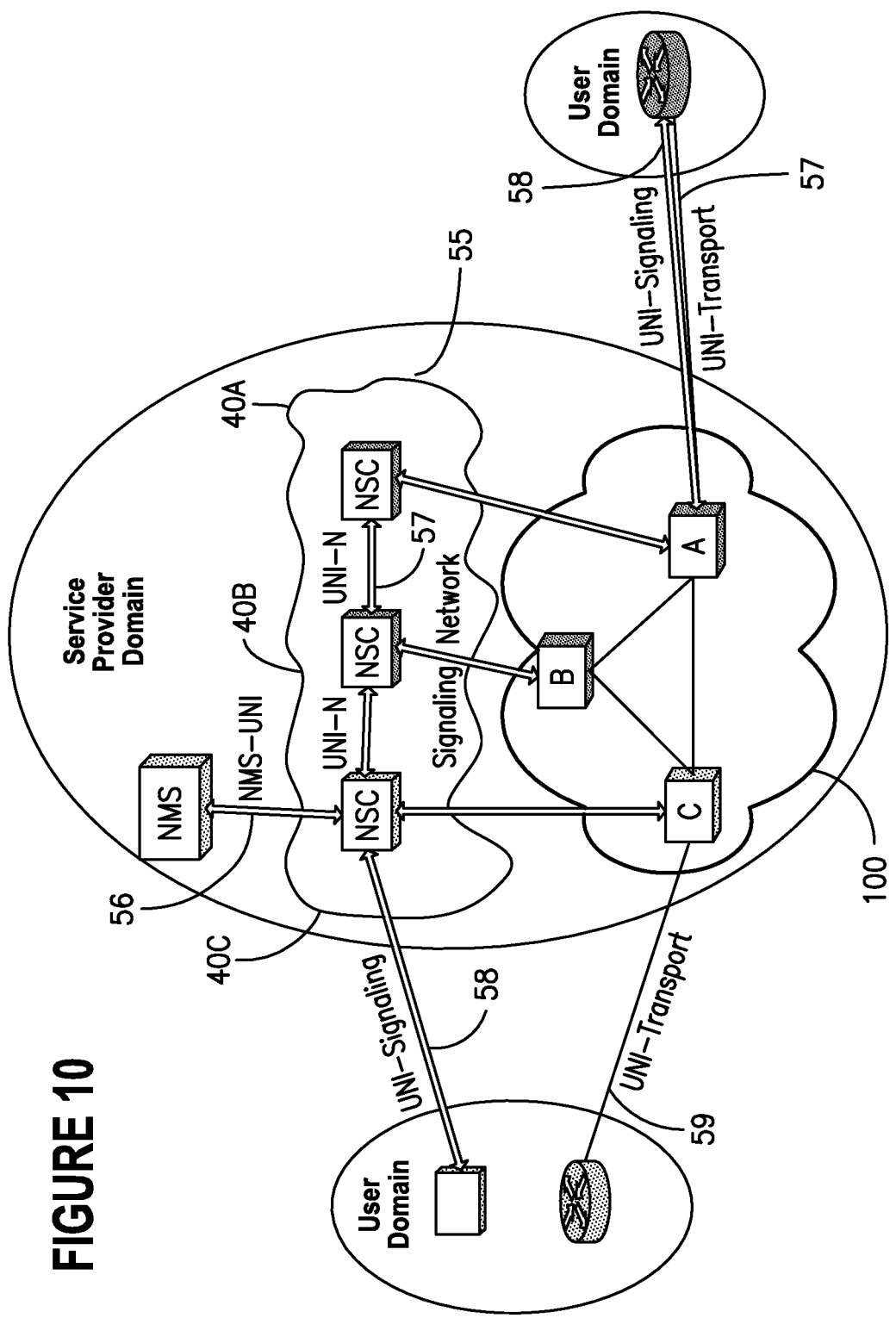
FIG. 10 shows the NMS-UNI information model.

FIG. 10 shows the network model intra-network communications and communication between the service provided domain and user domains. The physical network 100 includes in this example three nodes A, B and C, each node being monitored and controlled at the link and connection layer by a respective NSC 40A, 40B and 40C of network services control platform 17 (see also FIG. 2). Internal communication is performed over a signaling network 55, using UNI interfaces, namely a NMS-UNI interface 56 enables communication between the NMS and the NSC platform 17 and a UNI-N 57 enables communication between the NSCs 40.

Communication between the user domains and the network domain is performed over a UNI-Signaling interface 58 and a UNI Transport interface 59. The behaviors of the NMS_UNI interface 56 is similar to the user domain UNI-Signaling interface 58, but under the control of the service provider instead of end-user.

Signaling over the UNI is used to invoke services (e.g. connections) that the optical network offers to clients. The properties of a connection are defined by the attributes specified during connection establishment.

UNI Signaling interface 58 is used to invoke the following actions:

Connection creation. This action allows a connection with the specified attributes to be created between a pair of client points of attachment to the optical network. Connection creation may be subject to network defined policies (i.e. user group connectivity restrictions) and security procedures.

Connection deletion. This action allows an existing connection to be deleted and the resources allocated to that connection freed.

Connection status enquiry. This action allows the status of a certain parameters of the connection to be queried.

The NMS-UNI interface 56 adheres to and extends the OIF specification. Specifically, the extensions include adopting the CMISE-like framework protocol, so that a single protocol is used for all NMS to NSC interfaces. Another extension refers to the addition of a reserve-only capability to enable a user to select a single path from a set of possible reserved paths.

The NMS_UNI interface 56 is modeled by a single managed object called NMS_UNI, which is contained within the switch managed element object. The NMS_UNI generates alarms and maintains operational and administrative state.

Modeling Optical Calls

Figure 11A:
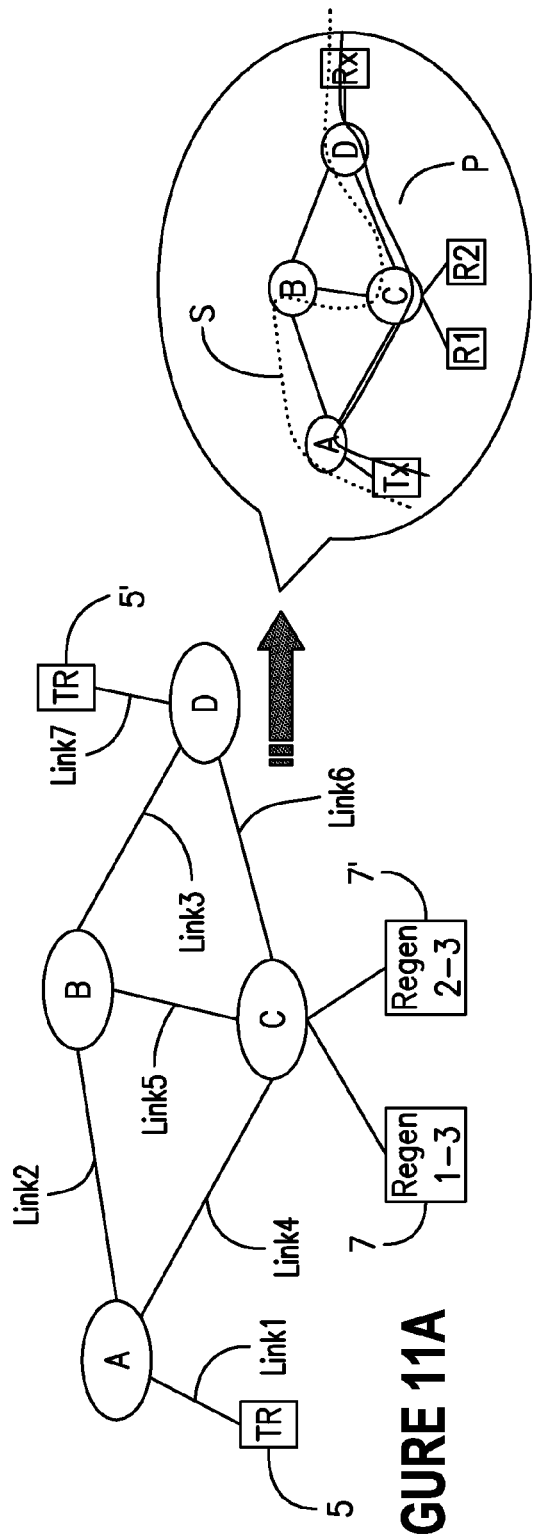
FIGS. 11A-11D show another example of a network model for illustrating call modeling.

The following description provides an example on how a call is established using an example of a network 200 shown in FIG. 11A. Network 200 has four nodes A-D, where node C is provided with a 3×3 wavelength switch. The optical call in this example intends to establish connection between the transmitter of a transponder 5 at node A, to the receiver of a transponder 5' at node D.

FIG. 11A also shows two regenerators 7 and 7' at intermediate node C one bridging links link4 and link5, and the other, link4 and link6.

Figure 11B:
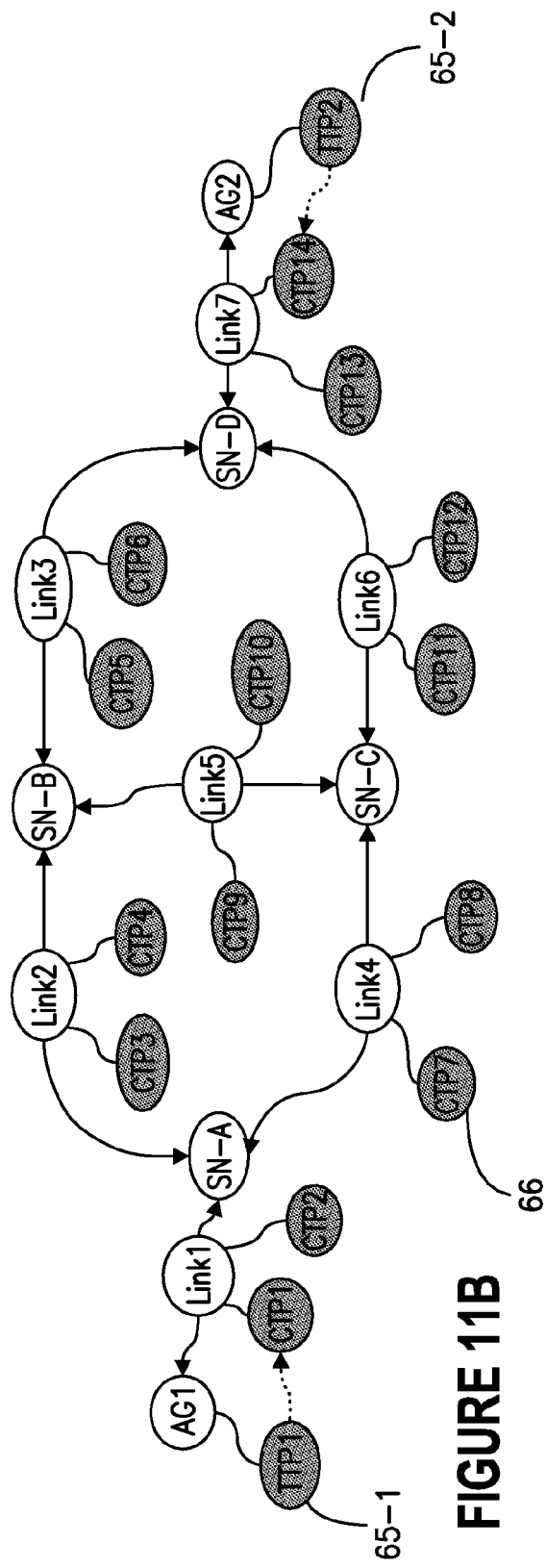

Network 200 is represented in the MIB 10 (see FIGS. 2 and 3) by the topology objects shown in FIG. 11B.

In FIG. 11B, subnetworks SN-A to SN-D represent the switching capabilitiesy of nodes A to D. Each link object link1-to link7 represents fixed connectivity between the wavelength switches, each potential channel in a link is associated with a network connection termination point at each end of the respective link, as shown by CTP1 to CTP14. It is to be noted that the link objects were denoted with the same reference as the physical links in FIG. 11A for simplification.

The entry/exit points of the network are modeled with a respective Access Group AG1 and AG2, where each access group contains a respective trail termination point TTP1, TTP2, which represent the termination point of an end-to-end call in the network. The regenerators 7 and 7' do not represent anything at the topology level since they contribute no topological information.

It is to be noted that the topological objects shown in FIG. 11B are not technology specific, as they are independent of implementation. In other words, the topology model does not give any indication that it represents optical network 200. No traffic is being carried in the network yet, so the transport objects will be created as/when the call is established.

Figure 11C:
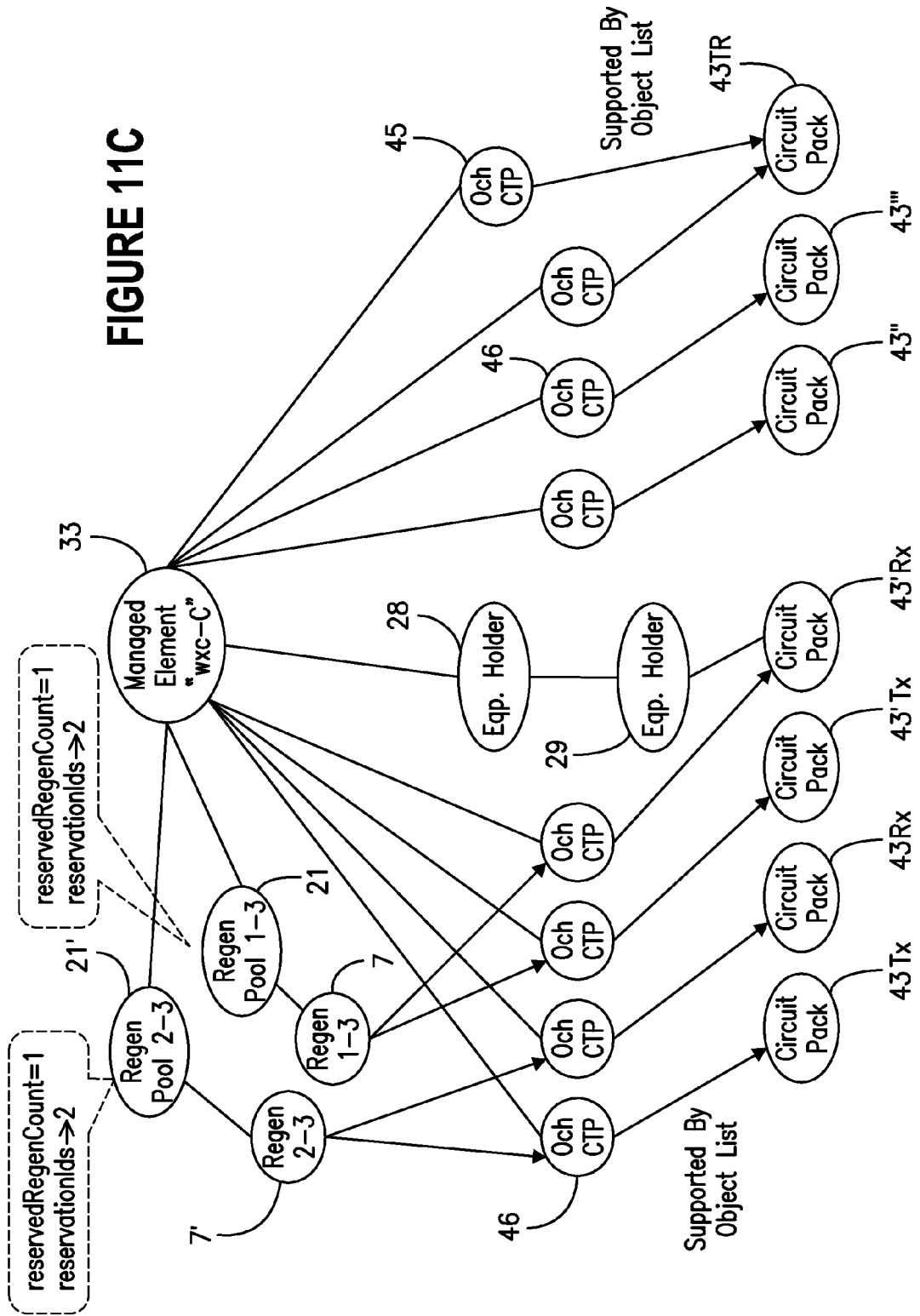

The NE model for switching node C is shown in FIG. 11C; as indicated above, this model expresses the actual equipment that implements node C. All objects are contained within the switch C managed element 33. The regenerator pools 21 and 21' contain the one regenerator each in this example, namely regenerator 7 and regenerator 7'. Equipment holder objects 28 and 29 model the shelf and slot respectively, and the circuit pack objects model the cards in the slots.

The optical channel connection termination points CTPs 46 represent the capability of ME 33 to carry optical channels and represent the state of a channel on ingress to and egress from the switch. They also contain a "supported by" object list, which map them to the physical circuit packs which support them. The circuit pack objects 43 contain an "affected" objects list that list the CTPs which they affect. The circuit pack objects model the transmitters 43Tx, 43'Tx and the receivers 43Rx, 43'Rx of regenerators 7 and 7', and other card-packs, as shown at 43', 43" and 43TR.

It is to be again emphasized that the NE model in FIG. 11C does not give any topology information. That is, no information about how MEs are connected together is represented.

Figure 11D:
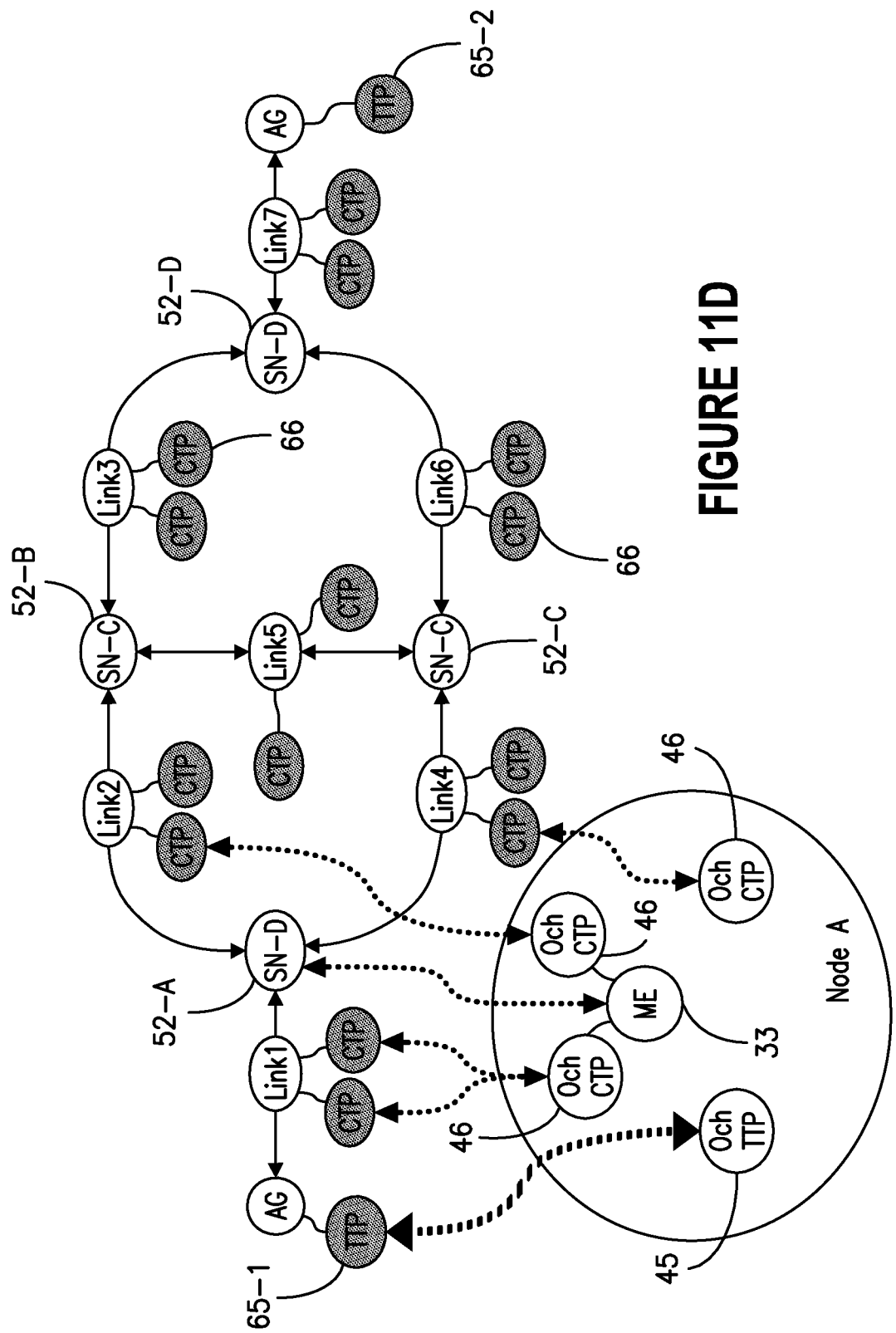

FIG. 11D depicts both the topology and the implementation of the network, as obtained by associating the two models in FIGS. 11B and 11C. FIG. 11 also shows the associations between the models, namely the association between network CTP 66 and optical channel CTP 46, subnetwork 52-A and ME 33, and network TTP 65 and optical channel TTP 45.

Although CTPs exist in both models, its important to reiterate that the network CTP in the topology model is completely generic while the optical channel CTP in the ME model is specific to modeling an optical channel termination point.

Also, note that in this example two of the network CTPs 66 at the end of link1 point to the same optical channel CTP 46 of the NE model. This is because in this representation the transponders and the switch are contained in the same ME 33; in this case the topological link object is virtual. When network 200 supports a remote TR, the link object is physical and the two network CTPs refer to two optical channel CTPs.

A 0:2 call refers to a class of service that provides a primary trail P for carrying the traffic and simultaneously a secondary trail S for protection/restoration, using a different set of end transceivers. The protection function is naturally included in the routing function; a connection request lights the P and S trails at the same time. Let's say that a call request is received by network 200, requiring a 0:2 CoS on an A-D connection, with forced regeneration at node C, as shown in the insert at FIG. 11A. "Forced regeneration" refers to the constraint received with the call to perform regeneration at node C.

Figure 12A:
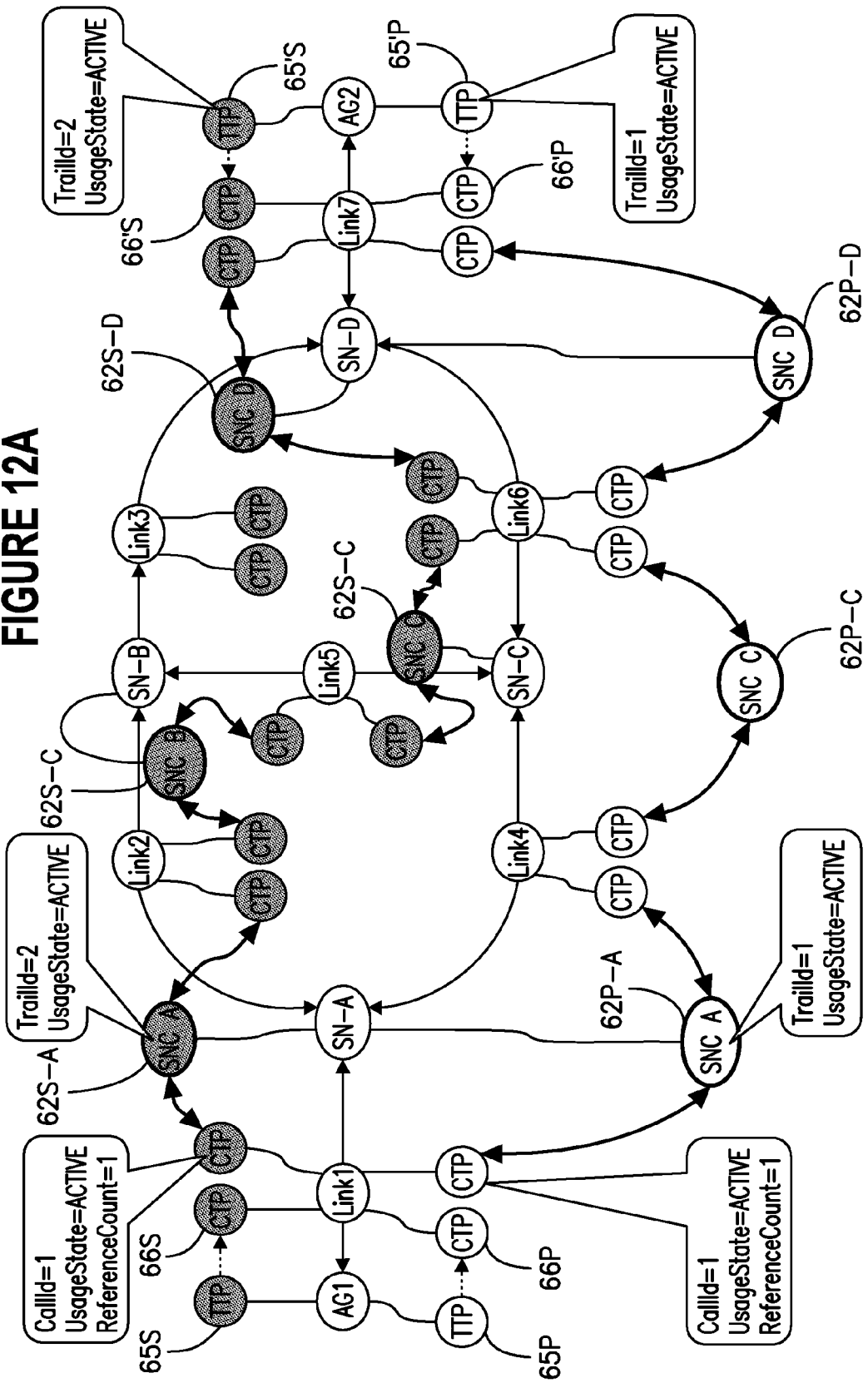
FIGS. 12A-12C illustrate how a call is modeled on network model of FIG. 11D, where

To establish this call, the NOS sends a 'connection create' action to the R&S control 12 (see FIG. 2). This request specifies the two ends A and D for both P and S trails, which results in four TTPs 65P and 65'P for trail P, and 65S and 65'S for trail S, and the forced regenerator inclusion node C; as shown in FIG. 12A. R&S control 12 (see FIG. 2) uses the four TTPs to find the four associated CTPs 66P, 66S, 66'P, 66'S on the end links link1 and link7 of the requested call. The four CTPs and the regenerator location are then used as end-points for the R&S control 12 to determine the two paths P and S. Once the paths are determined the following steps will occur:

A Call Id is created. Both trails P and S have the same Call Id.

A trail Id is created. Trails P and S have a different Trail Id

All of the associated CTPs are reserved, by setting a 'UsageState' attribute to ACTIVE and incrementing a ReferenceCount attribute by 1.

The Call Id is stored in all CTPs

Subnetwork connections (SNC) 62 are created for each P and S trail, binding the appropriate CTPs.

The appropriate Trail Id is stored in each SNC 62.

The appropriate Trail Id is stored in each TTP.

Layer 17 reserves the explicit regenerators 7 and 7' at the switch C NE by issuing a "reserve" action on the appropriate regenerator pool 21, 21' and using the Trail Id as the reservation identification, as shown in dotted lines on the NE model of FIG. 11C.

The Call Id, Trail Id and list of ingress/egress CTPs is returned to the NOS.

The Call is now in a 'reserved status' and ready to proceed to Activation. FIG. 12A shows the physical view of the routes (light gray for P trail and darker gray for S trail) in the 'reserved status'; both P and S trails pass through node C because of the forced regenerators restriction, illustrating the newly created subnetwork connections SNC-A to SNC-C and their state. As indicated above, both trails have the same Call Id in their CTPs but the SNCs and TTPs have different TrailId for each path.

The NEs are largely unchanged by reserving the trails, with the exception of switch C NE, where the regenerator pool objects 21 and 21' have an attribute ReservedRegenCount=1 and a ReservationId=TrailId. It is to be noted that the resources are usually reserved in the topology information model, with the exception of regenerators, which are reserved in the NE information model. Once a subnetwork connection is created, but not activated yet, it can reserve a regenerator from the regenerator pool 21, if explicitly requested by the call originator. Reservation can be either a specific regenerator 7, or any regenerator in the respective pool 21.

Layer 17 then sends two ActivateTrail commands to the respective NCC 14 (see FIG. 2). Each command comprises a trail description, which contains information about each hop in the connection, including the ingress/egress CTPs, the NSCs addresses and the pertinent regenerator information (inclusion, exclusion).

For each ingress/egress CTP in a trail, the NCC 14 (see FIG. 2) sends an ActivateCrossConnection request to an optical switch controller (not shown) on the appropriate NSC 40. The request contains the CTPs, the ReservationId and regenerator information, if any.

Figure 12B:
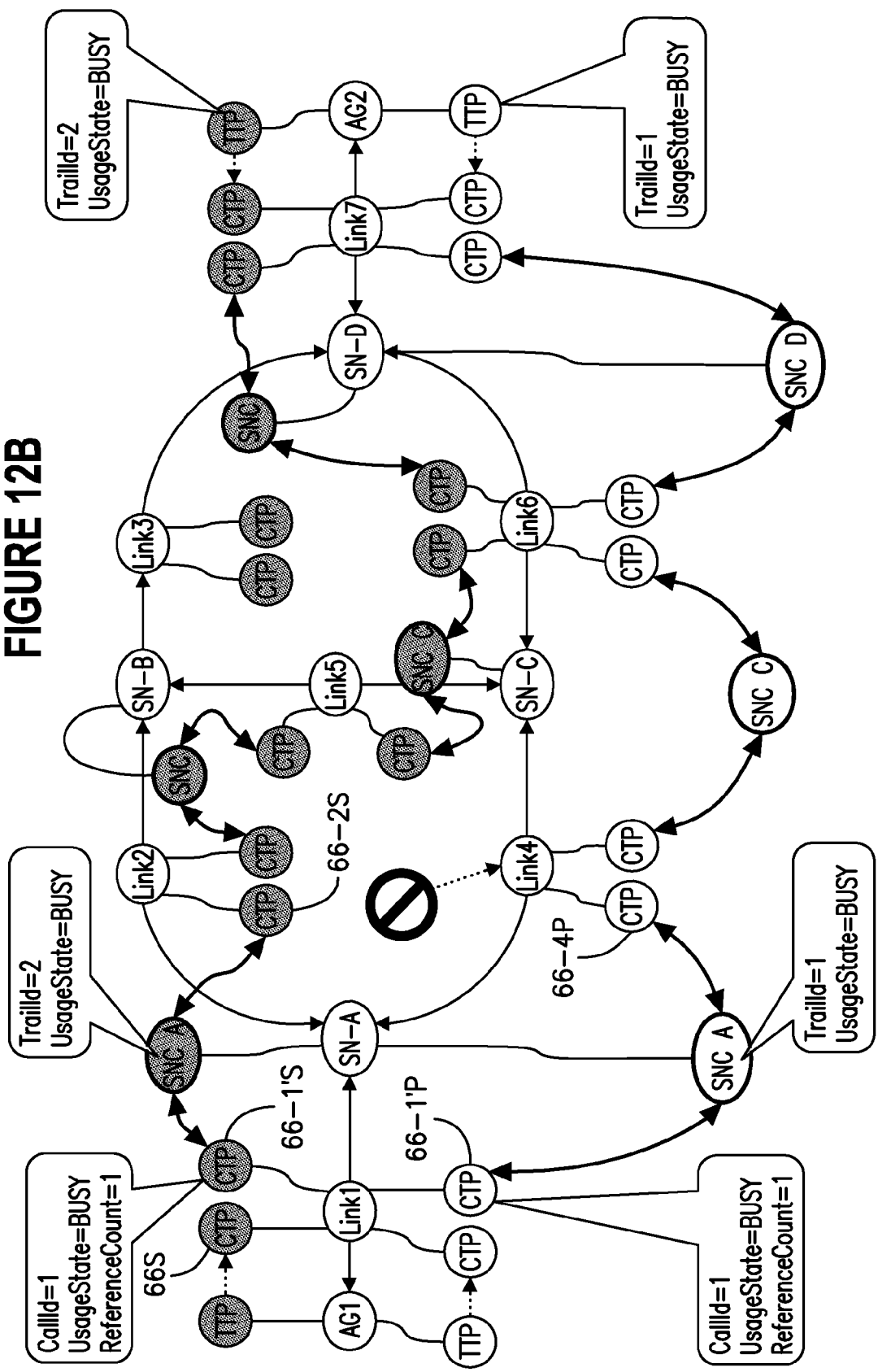

Each switch controller receives the ActivateCrossConnection request activates the call as described next and shown by the topological view in FIG. 12B.

Figure 12C:
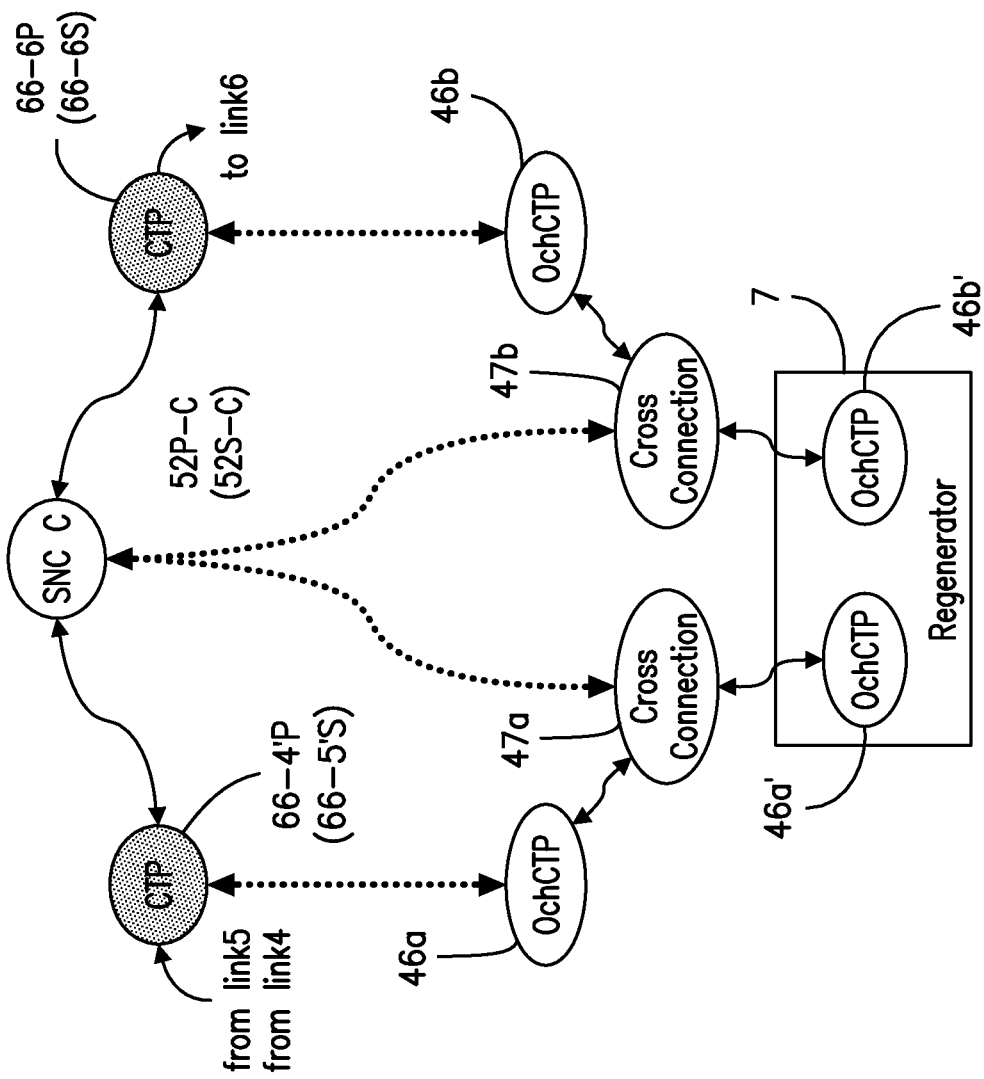

- Finds the associated optical channel CTPs 66. For example, the switch controller finds CTP 66-1'P and CTP 66-4P for the P trail and CTP 66-1'S and 66-2S for the S trail.
- Checks for an explicit regenerator (here at node C) and uses a RegenReservationId action to allocate the regenerators and update the ReservationIdList and ReservedRegenCount at the regenerator pool object;
- If a regenerator is required, creates two cross connection objects 47a and 47b as shown in FIG. 12C; one between the ingress tandem CTP 46a and the ingress regenerator CTP 46a' and another one between the egress regenerator CTP 46b' and the egress tandem CTP 46b.
- If no regenerator is required, it creates a single cross connection object between the two associated tandem CTPs 46a and 46b.
- Links all cross connection objects 47 in the NE model and the SNCs 62 together using two-way name references. This is shown for node C in FIG. 12C.
- Sets the UsageState for the SNC 62, optical channel CTPs, and network CTPs to BUSY.
- Returns a successful ActivateCrossConnectionResponse to the NCC.

Once the NCC 14 receives successful responses from all switch controllers, it returns a successful ActivateConnectionResponse to the R&S control 12.

Once both trails have been activated, the R&S control 12 sets the UsageState of the network TTPs to BUSY and returns a successful ConnectionCreateResponse to the NOS. The 0:2 Call is now activated.

Figure 13A:
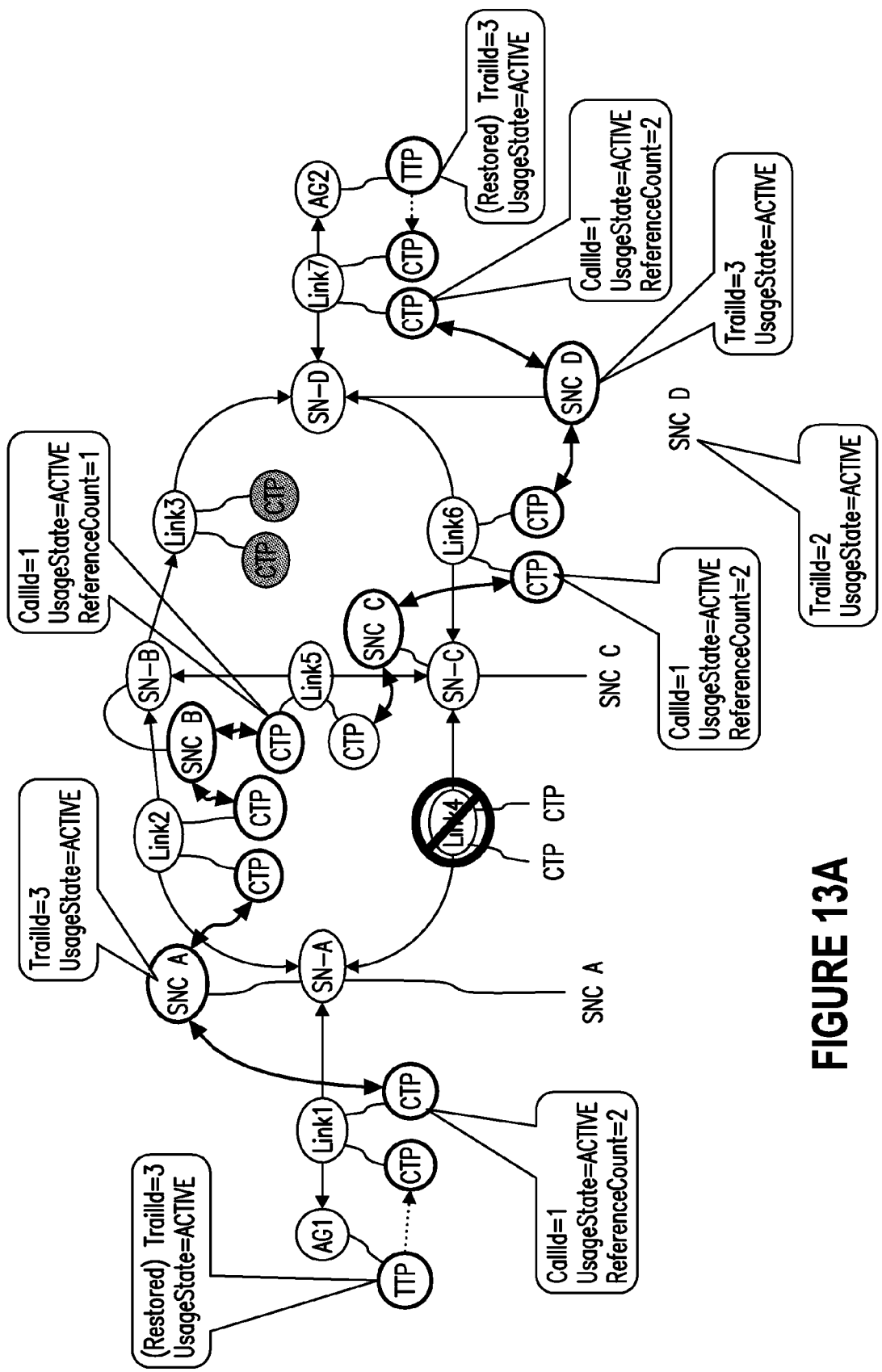
FIGS. 13A and 13B show how a failed trail is restored for the example of the 0:2 call in FIG. 12A.

FIGS. 13A and 13C show how a failed trail is restored for the example of the 0:2 call discussed above. Let's assume now that link4 fails as marked on FIG. 12A, and trails P must be recovered. The fault management of NOS will detect a Loss Of Signal LOS error reported by the optical channel CTP on link4. The R&S control 12 associates the LOS with the affected trail, in this case trail P and the call, in this case the 0:2 call requesting to connect nodes A and D. The R&S control 12 then deactivates the failed trail P by sending a DeactivateTrail command to the NCC 14, which passes this to all subnetwork connections along this trail.

The NCC 14 also directs all associated switch controllers to delete the cross connection objects associated with the NE model for the network elements along trail P. Essentially, the failed trail is returned from the "Busy" state to the "Reserved" state, shown in FIG. 12A.

The R&S mechanism of R&S control 12 now begins to establish the protection path by re-sending the end CTPs to the routing engine. Since the failed trail P has been completely deactivated, its resources are now available for reuse by trail S. Only trail S is allowed to reuse these resources. The system can easily enforce this since trails P and S carry the same CallId.

The R&S control 12 is provided with the link4 as a new constraint and a new path is determined. For this example, it is assumed that the explicit regenerator constraint does not propagate to the redialed path. Should this change, the regenerator constraints could also be provided to the R&S control.

R&S control 12 creates a new TrailId, e.g. TrailId=3, and reserves the required CTPs as before. The R&S control then stores trail S in a StandbyTrailRef attribute of the original P trail. A ProtectionActive attribute is also set to TRUE for trail S. The rerouted trail passes from node A to node B, C and D.

Figure 13B:
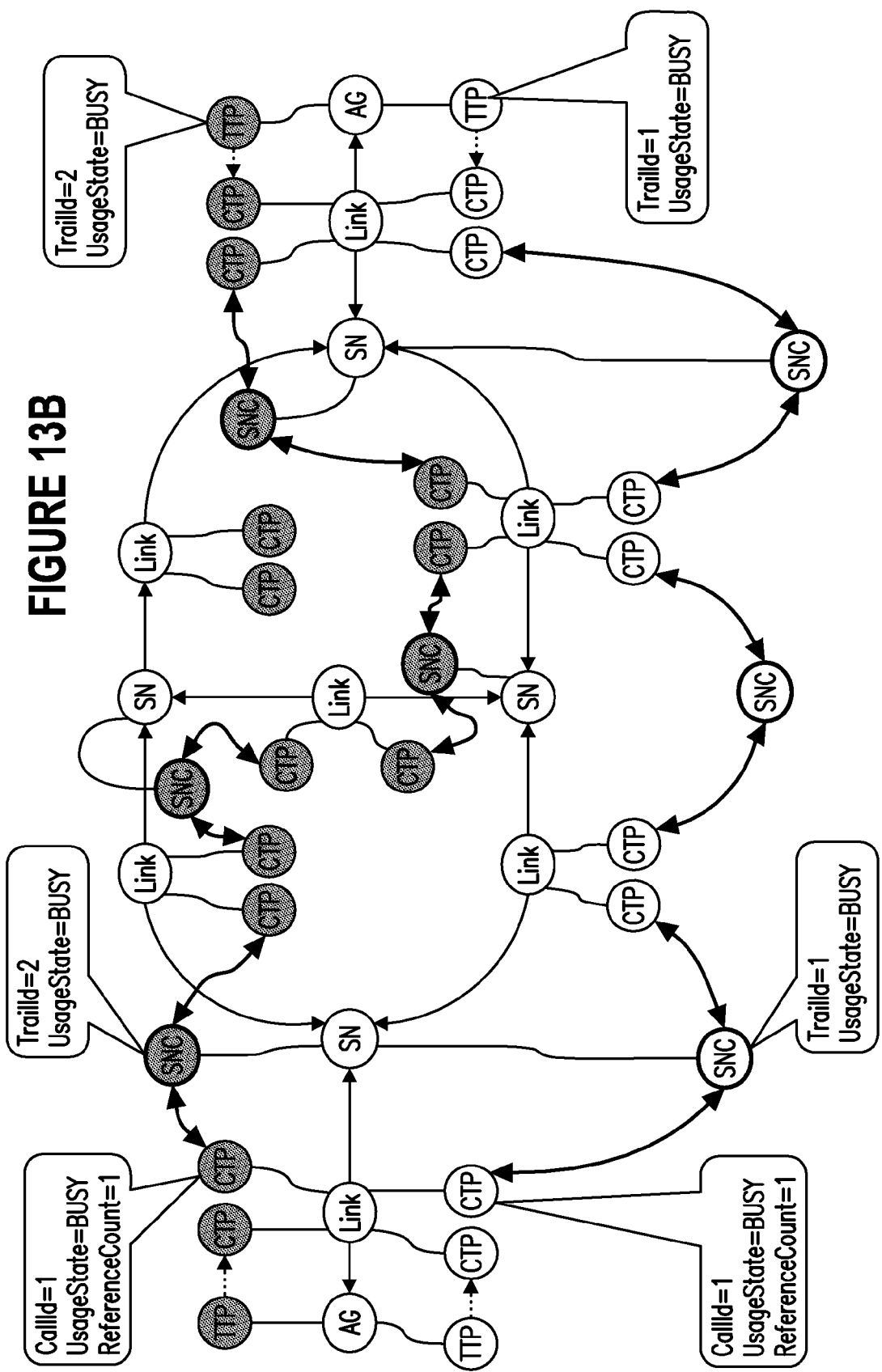

FIG. 13B shows the topology model after reservation, where the original path is shown in patterned gray and the protection trail S is shown in light gray. In this model, as the restored trail has a new TrailId but the same Callid, the TTP TrailID is also set to 3. The CTPs that have been reused have a ReferenceCount=2, and they only point to their most recent SNC (i.e. knowledge of the original SNC is not kept by the CTP), as shown for SNC-D. The SNCs from the original trail P continue to refer to their CTPs even if they have been reused (i.e. the original SNCs are essentially unaware of the trail S).

The protection trail always creates SNCs between its CTPs, even if the two CTPs already have an SNC created from the original trail. This maintains independence between the original and secondary trails, enabling easy reversion and easy re-dialing of the trail S, should it also fail.

The R&S control 12 now sends an ActivateTrail( ) to the NCC as before, the only difference being that no explicit regenerators are included at node C in this example, although one could be selected by NCC.

The traffic on failed trail P has now been restored with over trail S protection trail).

FIG. 13B shows how to revert the traffic from the secondary path S trail to its original path P. Let's say that once the troubled link4 has been fixed, the operator decides to revert the connection to its original path P. The following steps will occur:

A ConnectionRevert( ) action is sent from the NOS to the R&S control. The request contains the CallId and the original TrailId. This is because it is possible that both trails P and S of the call have failed and been re-dialed, hence the specification of both Call Id and Trail Id are needed at the R&S control.

The R&S control 12 then deactivates trail S by sending a DeactivateTrail( ) command to the NCC 14, passed to all CTPs that make up trail S.

The NCC will command all associated switch controllers to delete the cross connection objects associated with trail S. The cross connection reference(s) in the subnetwork connections SNC are set to NULL.

The R&S control 12 then un-reserves the CTPs associated with the SNCs by decrementing the ReferenceCount by one and setting the SNC association to NULL. If the ReferenceCount equals 0, then the CTP UsageState is changed to FREE. In this example, the ReferenceCount is 1, so the UsageState is still ACTIVE.

The R&S control 12 then deletes all SNCs associated with the trail S.

The R&S control 12 sets the StandbyTrailRef in the Trail to NULL and a ProtectionActive attribute to FALSE. Trail S has now been completely removed.

The R&S control 12 must now check and re-establish the association from the CTP to SNC. That is, the SNC still refers to the original CTPs, but the CTPs may have been re-used by trail S, so their SNC references must be restored. It is possible to design the CTP reservation mechanism so that the previous SNC pointer is remembered in the CTP and automatically restored upon un-reserve.

Once the CTP references have been restored, the trail will be in its original reserved state.

Any explicit regenerators are restored in the NE model, by issuing a "reserve" action on the appropriate regenerator pool and the Trail Id used as the reservation id.

The R&S control 12 can now send the ActivateTrail( ) request to the NCC 14, specifying all parameters that were specified in the original activate request When the NCC returns a successful response, the control plane returns a successful ConnectionRevertResponse( ) to the NOS. The original trail has now been reverted.

We claim:

1. A method for modeling a call in an agile optical network comprising:
    receiving a connection request specifying a source node, a destination node, and a class of service CoS;
    creating a call identifier (ID) for identifying said call, and a trail ID for identifying a trail beginning at said source node and ending at said destination node, and requesting regenerator locations and nodes along said trail;
    reserving said trail, said reserving comprising;
        reserving a trail termination point (TTP) object at each said source and destination node, including storing said trail ID in each TTP object; and
    activating said trail for establishing said call over said trail.

2. A method for modelling a call in an agile optical network comprising:
    receiving a connection request specifying a source node, a destination node, and a class of service CoS;
    creating a call identifier (ID) for identifying said call, and a trail ID for identifying a trail beginning at said source node and ending at said destination node, and requesting regenerator locations and nodes along said trail;
    at each switching node along said trail, receiving an "activate cross connection" request;
    detecting in said network information model associations between a CTP topology object and a CTP managed object;
    creating a subnetwork connection SNC across a cross-connect network object between said CTP managed objects;
    associating cross-connection objects along said trail with the respective SNC; and
    setting an UsageState attribute to "busy" for said SNC topological objects, CTP objects and TTP managed objects;
    reserving said trail; and
    activating said trail for establishing said call over said trail.

3. A system comprising:
    a network services control platform operable to,
    receive a connection request specifying a source node, a destination node, and a class of service CoS,
    create a call identifier (ID) for identifying said call, and a trail ID for identifying a trail beginning at said source node and ending at said destination node, and requesting regenerator locations and nodes along said trail,
    reserve said trail by reserving a trail termination point (TTP) object at each said source and destination node, including storing said trail ID in each TTP object; and
    activate said trail for establishing said call over said trail.

4. The system as claimed in claim 3, wherein the platform is further operable to:
    reserve connection termination points (CTP) topology objects along said trail by storing said call ID at each said CTP topology object, setting a UsageState attribute to "active" and incrementing a ReferenceCount attribute by 1;
    create subnetwork connection (SNC) objects by binding the appropriate CTP topology objects along said trail and storing said trail ID at each said SNC object; and
    reserve an explicit regenerator, if included in said connection request by issuing a "reserve" action on the appropriate regenerator pool object and using said trail ID as a reservation ID for said regenerator.

5. The system as claimed in claim 3 further comprising:
    one or more switching nodes along said trail, wherein each node is operable to,
    receive an activate cross connection request,
    detect associations between a CTP topology object and a CTP managed object;
    create a subnetwork connection SNC across a cross-connect network object between said CTP managed objects;
    associate cross-connection objects along said trail with the respective SNC; and
    set an UsageState attribute to "busy" for said SNC topological objects, CTP objects and TTP managed objects.

6. One or more computing platform memories for storing instructions used to model a call in an agile optical network, the instructions executable to:
    receive a connection request specifying a source node, a destination node, and a class of service CoS;
    create a call identifier (ID) for identifying said call, and a trail ID for identifying a trail beginning at said source node and destination node, and requesting regenerator locations and nodes along said trail;

reserve said trail by reserving a trail termination point (TTP) object at each said source and destination node, including storing said trail ID in each TTP object; and activate said trail for establishing said call over said trail.

7. The one or more computing platform memories as in claim 6 further comprising instructions executable to:

reserve all connection termination points (CTP) topology objects along said trail by storing said call ID at each said CTP topology object, setting a UsageState attribute to "active" and incrementing a ReferenceCount attribute by 1;

create subnetwork connection (SNC) objects by binding the appropriate CTP topology objects along said trail and storing said trail ID at each said SNC object; and reserve an explicit regenerator, if included in said connection request by issuing a "reserve" action on the appropriate regenerator pool object and using said trail ID as a reservation ID for said regenerator.

8. The one or more computing platform memories as in claim 6, wherein each computing platform memory comprises at least one optical switch controlling element located at each switching node along said trail and each of the optical switch controlling elements further comprising instructions executable to:

receive an "activate cross connection" request;

detect in said network information model all associations between a CTP topology object and a CTP managed object;

create a subnetwork connection SNC across a cross-connect network object between said CTP managed objects;

associate all cross-connection objects along said trail with the respective SNC; and set an UsageState attribute to "busy" for all said SNC topological objects, CTP objects and TTP managed objects.

9. The method as claimed in claim 1 further comprising:

reserving connection termination points (CTP) topology objects along said trail, including storing said call ID at each said CTP topology object.

10. The method as claimed in claim 9 wherein reserving connection termination points (CTP) topology objects along said trail includes storing said call ID at each said CTP topology object, setting a UsageState attribute to "active" and incrementing a ReferenceCount attribute by 1.

11. The method as claimed in claim 1 further comprising creating subnetwork connection (SNC) objects, including binding the appropriate CTP topology objects along said trail and storing said trail ID at each said SNC object.

12. The method as claimed in claim 1 further comprising creating subnetwork connection (SNC) objects by binding the appropriate CTP topology objects along said trail and storing said trail ID at each said SNC object; and reserving an explicit regenerator, if included in said connection request by issuing a "reserve" action on the appropriate regenerator pool object and using said trail ID as a reservation ID for said regenerator.

13. The method as claimed in claim 12 wherein reserving connection termination points (CTP) topology objects along said trail includes storing said call ID at each said CTP topology object, setting a UsageState attribute to "active" and incrementing a ReferenceCount attribute by 1.

14. A method for modeling a call in an agile optical network comprising:

receiving a connection request specifying a source node, a destination node, and a class of service CoS;

creating a call identifier (ID) for identifying said call, and a trail ID for identifying a trail beginning at said source node and ending at said destination node, and requesting regenerator locations and nodes along said trail;

reserving an explicit regenerator, if included in said connection request, by issuing a "reserve" action on the appropriate regenerator pool object and using said trail ID as a reservation ID for said regenerator reserving said trail, and activating said trail for establishing said call over said trail.

15. The method as claimed in claim 14, further comprising reserving connection termination points (CTP) topology objects along said trail, including storing said call ID at each said CTP topology object.

16. The method as claimed in claim 14, further comprising reserving a trail termination point (TTP) object at each said source and destination node, including storing said trail ID in each TTP object.

* * * * *